(12) United States Patent
Petersen

(10) Patent No.: US 11,228,243 B2
(45) Date of Patent: Jan. 18, 2022

(54) POWER CONVERTER WITH REDUCED RMS INPUT CURRENT

(71) Applicant: Dialog Semiconductor (UK) Limited, London (GB)

(72) Inventor: Holger Petersen, Pastetten (DE)

(73) Assignee: Dialog Semiconductor (UK) Limited, London (GB)

( * ) Notice: Subject to any disclaimer, the term of this patent is extended or adjusted under 35 U.S.C. 154(b) by 13 days.

(21) Appl. No.: 16/900,669

(22) Filed: Jun. 12, 2020

(65) Prior Publication Data

US 2021/0391786 A1 Dec. 16, 2021

(51) Int. Cl.
  *H02M 3/07* (2006.01)
  *H02M 3/158* (2006.01)
  *H02M 1/088* (2006.01)

(52) U.S. Cl.
  CPC ............ *H02M 3/07* (2013.01); *H02M 1/088* (2013.01)

(58) Field of Classification Search
  CPC .................. H02M 3/07; H02M 3/073; H02M 3/158–1588
  See application file for complete search history.

(56) References Cited

U.S. PATENT DOCUMENTS

| | | |
|---|---|---|
| 6,963,497 B1 | 11/2005 | Herbert |
| 7,230,405 B2 | 6/2007 | Jang et al. |
| 7,782,027 B2 | 8/2010 | Williams |
| 8,427,113 B2 | 4/2013 | Xing et al. |
| 9,559,589 B2 | 1/2017 | Petersen |
| 9,768,682 B2 | 9/2017 | Banag |
| 9,948,177 B2 | 4/2018 | Alarcon-Cot |
| 10,075,080 B1 | 9/2018 | Scoones |
| 10,218,255 B1 | 2/2019 | Petersen |
| 10,256,729 B1 | 4/2019 | Notsch |
| 10,291,117 B2 | 5/2019 | Petersen |

(Continued)

FOREIGN PATENT DOCUMENTS

DE 10 2016 217 040 A1 3/2018
WO 2014/154390 A1 10/2014

OTHER PUBLICATIONS

Co-Pending U.S. Appl. No. 16/919,928, filed Jul. 2, 2020, Inventor: CANNILO et al., "Hybrid multi-level power converter with interstate inductor," 33 pages.

(Continued)

*Primary Examiner* — Sisay G Tiku
(74) *Attorney, Agent, or Firm* — Saile Ackerman LLC; Stephen B. Ackerman

(57) ABSTRACT

A power converter includes a first flying capacitor, an inductor, and a driver. A network of switches has a first switch to couple the first flying capacitor to a first port, and a second switch to couple the inductor to ground. The driver is adapted to drive the network of switches with a sequence of states that includes a first state and a second state. In the first state the ground port is coupled to a second port via a first path comprising the first flying capacitor and the inductor, and the first port is decoupled from the second port. In the second state the ground port is coupled to second port via a second path comprising the second switch and the inductor, and the first port is coupled to the second port via a third path comprising the first flying capacitor while bypassing the inductor.

17 Claims, 22 Drawing Sheets

(56) References Cited

U.S. PATENT DOCUMENTS

| | | | |
|---|---|---|---|
| 10,530,256 B1 | 1/2020 | Jayaraman | |
| 10,547,241 B1 | 1/2020 | Li | |
| 10,615,697 B1* | 4/2020 | Ferrari | H02M 3/158 |
| 10,622,890 B1* | 4/2020 | Lidsky | H02M 3/158 |
| 10,637,352 B2 | 4/2020 | Illiano | |
| 10,727,747 B2* | 7/2020 | Macri | H02M 7/4837 |
| 10,756,623 B1 | 8/2020 | Petersen | |
| 10,790,742 B1 | 9/2020 | Petersen | |
| 10,879,801 B2* | 12/2020 | Zhang | H02M 3/1584 |
| 11,005,371 B2 | 5/2021 | Cannillo | |
| 2001/0022735 A1 | 9/2001 | Zanuccoli | |
| 2008/0079393 A1 | 4/2008 | Spartano et al. | |
| 2008/0157732 A1 | 7/2008 | Williams | |
| 2008/0158915 A1 | 7/2008 | Williams | |
| 2009/0033289 A1 | 2/2009 | Xing et al. | |
| 2009/0174466 A1 | 7/2009 | Hsieh et al. | |
| 2010/0188065 A1 | 7/2010 | Shiwaya | |
| 2011/0062940 A1 | 3/2011 | Shvartsman | |
| 2013/0147543 A1 | 6/2013 | Dai et al. | |
| 2014/0070787 A1 | 3/2014 | Arno | |
| 2015/0015088 A1 | 1/2015 | Petersen | |
| 2015/0061613 A1 | 3/2015 | Kondou | |
| 2015/0084611 A1 | 3/2015 | Agrawal et al. | |
| 2015/0280553 A1 | 10/2015 | Giuliano et al. | |
| 2015/0311793 A1 | 10/2015 | Khayat et al. | |
| 2016/0344214 A1 | 11/2016 | Petersen et al. | |
| 2016/0352218 A1 | 12/2016 | Stauth | |
| 2017/0149337 A1 | 5/2017 | Petersen | |
| 2017/0244318 A1 | 8/2017 | Giuliano | |
| 2017/0279348 A1 | 9/2017 | Kulkarni | |
| 2017/0302093 A1 | 10/2017 | Petersen | |
| 2018/0175726 A1 | 6/2018 | Petersen | |
| 2019/0149041 A1 | 5/2019 | Larsen | |
| 2019/0207519 A1 | 7/2019 | Chakraborty | |
| 2019/0341850 A1 | 11/2019 | Macri | |
| 2019/0348913 A1 | 11/2019 | Zhang | |
| 2020/0044578 A1 | 2/2020 | Mangudi | |
| 2020/0091818 A1 | 3/2020 | Toni | |
| 2020/0144909 A1 | 5/2020 | Baek | |
| 2020/0295655 A1 | 9/2020 | Takahiro | |
| 2020/0350817 A1 | 11/2020 | De | |
| 2021/0050786 A1 | 2/2021 | Park | |
| 2021/0152100 A1 | 5/2021 | Zillo | |
| 2021/0234462 A1* | 7/2021 | Cannillo | H02M 3/1584 |

OTHER PUBLICATIONS

Co-Pending U.S. Appl. No. 16/386,735, filed Apr. 17, 2019, Inventor: Holger Petersen, "A Power Converter," 37 pages.

US Notice of Allowance, U.S. Appl. No. 16/386,735, First Named Inventor: Holger Petersen, dated Jun. 10, 2020, 13 pages.

US Office Action, U.S. Appl. No. 16/386,735, Applicant: Holger Petersen, dated Feb. 10, 2020, 21 pages.

"Split-Phase Control: Achieving Complete Soft-Charging Operation of a Dickson Switched-Capacitor Converter," by Yutian Lei et al., IEEE Transactions on Power Electronics, vol. 31, No. 01, Jan. 2016, pp. 770-782.

"A Hybrid Dual-Path Step-Down Converter with 96.2% Peak Efficiency using a 250mΩ Large-DCR Inductor," by Yeunhee Huh et al., 2018 Symposium on VLSI Circuits Digest of Technical Papers, Jun. 18-22, 2018, pp. 225-226.

"A Hybrid Structure Dual-Path Step-Dwon Converter With 96.2% Peak Efficiency Using 250-mΩ Large-DCE Inductor," by Yuenhee Huh et al., IEEE Journal of Solid-State Circuits, vol. 54, No. 4, Apr. 2019, pp. 959-967.

"Multiphase buck converters with extended duty cycle," by Yungtaek Jang et al., Twenty-First Annual IEEE Applied Power Electronics Conference and Exposition, APEC '06, Mar. 19-23, 2006, pp. 38-44.

"A Hybrid Inductor-Based Flying-Capacitor-Assisted Step-Up/Step-Down DC-DC Converter with 96.56% Efficiency," by Yong-Min Ju et al., 2017 IEEE International Solid-State Circuits Conference (ISSCC), Feb. 5-9, 2017, pp. 184-186.

"A Fully-Integrated 3-Level DC-DC Converter for Nanosecond-Scale DVFX," by Wonyoung Kim et al., IEEE Journal of Solid-State Circuits, vol. 47, No. 1, Jan. 2012, pp. 206-219.

"Multi-Level Conversion: High Voltage Choppers and Voltage-Source Inverters," by T.A. Meynard et al., PESC '92 Record. 23rd Annual IEEE Power Electronics Specialists Conference, Jun. 29-Jul. 3, 1992, pp. 397-403.

"A Hybrid Switched-Capacitor/Inductor Converter for Small Conversion Ratios," by Norah Elena Nakibuuka, Thesis: M. Eng., Massachusetts Institute of Technology, Department of Electrical Engineering and Computer Science, 2013, May 2013, 69 pages.

"Analysis of Double Step-Down Two-Phase Buck Converter for VRM," by K. Nishijima et al, Intelec 05—Twenty-Seventh International Telecommunications Conference, Sep. 18-22, 2005, pp. 497-502.

"Right-Half-Plane Zero Elimination of Boost Converter Using Magnetic Coupling With Forward Energy Transfer," by Behzad Poorali et al., IEEE Transactions on Industrial Electronics, vol. 66, No. 11, Nov. 2019, pp. 8454-8462.

"Fully Integrated Buck Converter with 78% Efficiency at 365mW Output Power Enabled by Switched-Inductor-Capacitor Topology and Inductor Current Reduction Technique," by Nghia Tang et al., 2019 IEEE International Solid-State Circuits Conference—(ISSCC), Feb. 17-21, 2019, pp. 153-154.

"A New Approach to Low Ripple-Noise Switching Converters on the Basis of Switched-Capacitor Converters," by Tohru Umeno et al., 1991., IEEE International Sympoisum on Circuits and Systems, Jun. 11-14, 1991, pp. 1077-1080.

"Zero Inductor Voltage Multilevel Bus Converter," by Samuel Webb et al., 2018 IEEE Applied Power Electronics Conference and Exposition (APEC), Mar. 4-8, 2018, pp. 2175-2182.

"Three-Level Buck Converter for Envelope Tracking Applications," by Vahid Yousefzadeh et al., IEEE Transactions on Power Electronics, vol. 21, No. 2, Mar. 2006, pp. 549-552.

US Office Action, U.S. Appl. No. 16/900,678, Applicant: Holger Petersen, dated Aug. 13, 2021, 24 pages.

German Office Action, File No. 10 2020 213 004.3, Applicant: Dialog Semiconductor (UK) Limited, dated Jun. 24, 2021, 6 pages.

German Office Action, File No. 10 2020 213 005.1, Applicant: Dialog Semiconductor (UK) Limited, dated Jun. 24, 2021, 6 pages.

* cited by examiner

POWER CONVERTER WITH REDUCED RMS INPUT CURRENT

RELATED PATENT APPLICATION

This application is related to U.S. application Ser. No. 16/900,678, filed on Jun. 12, 2020, filed on the same day as the instant application, which is herein incorporated by reference in its entirety.

TECHNICAL FIELD

The present disclosure relates to a power converter and a method of operating the same. In particular, the present disclosure relates to a power converter operable with a small output-to-input voltage conversion ratio, for instance a conversion ratio Vout/Vin<1/4.

BACKGROUND

Typical Voltage-Regulator-Modules (VRMs) such as the ones used in industrial, server, networking and computing applications are supplied from a supply voltage (e.g. 12V) that is much higher than the maximum input voltage of the load. For instance, the voltage supply may be 12V and the input voltage of the load may be <1.8V for CPU, GPU, SoC or other memory module.

Traditional buck converter and 3-level buck converter implement a step-down voltage conversion by pulling (for a duty cycle D<1) a current pulse from the input terminal equal to the load current. As a result, the amplitude of input current pulses is equal to the load current resulting in application noise and EMI issues. Multi-phase converters distribute the load current across multiple inductors, which increases the duty cycle during which a current is pulled from the input terminal. Therefore, the level of the switched input current is reduced by the number of phases up to certain duty cycle. However, this approach requires the use of multiple coils that increase the total inductor core loss.

Besides, in conventional DC-DC converters the inductor acts for short time intervals as a constant current source. Consequently, the inductor requires a significant time to respond to a sudden change in load current, hence providing limited transient load response.

SUMMARY

There is therefore a need for efficient power conversion when the output-to-input voltage ratio $V_{OUT}/V_{IN}$ is relatively small for instance less than 1/4.

It is an object of the disclosure to address one or more of the above-mentioned limitations.

According to a first aspect of the disclosure, there is provided a power converter for providing an output voltage with a target conversion ratio, the power converter having a ground port, a first port, and a second port, wherein when the power converter operates as a step-down converter the first port receives an input voltage and the second port provides the output voltage and when the power converter operates as a step-up converter the second port receives an input voltage and the first port provides the output voltage; the power converter comprising a first flying capacitor coupled to a network of switches, an inductor coupled to the second port, and a driver; the network of switches comprising a first switch to couple the first flying capacitor to the first port; a second switch to couple the inductor to ground; the driver being adapted to drive the network of switches with a sequence of states during a drive period, the sequence of states comprising a first state and a second state, wherein in the first state the ground port is coupled to the second port via a first path comprising the first flying capacitor and the inductor, and the first port is decoupled from the second port, wherein in the second state the ground port is coupled to second port via a second path comprising the second switch and the inductor, and wherein the first port is coupled to the second port via a third path comprising the first flying capacitor while bypassing the inductor.

Optionally, the power converter further comprises a second flying capacitor coupled to the second port via a first inductor switch, wherein the network of switches comprises a capacitor switch between the first flying capacitor and the second flying capacitor.

Optionally, wherein in the first state the first path comprises the first flying capacitor, the capacitor switch, the second flying capacitor and the inductor, and wherein in the second state the ground terminal is coupled to the second port via a ground path comprising the second switch, the second flying capacitor and the first inductor switch, while bypassing the inductor.

Optionally, the network of switches comprises a second capacitor switch between the first flying capacitor and the second flying capacitor, and a ground switch to couple the second flying capacitor to ground.

Optionally, the inductor is coupled to the first flying capacitor via a second inductor switch, and the first flying capacitor is coupled to the second port via a third capacitor switch.

Optionally, wherein in the first state the ground port is coupled to the second port via another path comprising the ground switch, the second flying capacitor, the first inductor switch and the inductor; and wherein in the second state the first port is coupled to the second port via a path comprising the capacitor switch, the second flying capacitor, the second capacitor switch, the first flying capacitor and the third capacitor switch, while bypassing the inductor.

Optionally, the power converter further comprises a third flying capacitor, the third flying capacitor having a first terminal coupled to the first flying capacitor via a first coupling switch, and a second terminal coupled to the first flying capacitor via a second coupling switch.

Optionally, the driving sequence comprises a primary first-state, a secondary first-state, a primary second-state and a secondary second-state.

Optionally, wherein in the primary second-state the ground port is coupled to the second port via a first ground path comprising the second flying capacitor while bypassing the inductor, and wherein the first port is coupled to the second port via a path comprising the first and third flying capacitors while bypassing the inductor.

Optionally, wherein in the secondary second state the ground port is coupled to the second port via the first ground path, and a second ground path comprising the first and third flying capacitors while bypassing the inductor.

Optionally, wherein in the primary and secondary first states the ground port is coupled to the second port via a path comprising the first flying capacitor, the second flying capacitor and the inductor.

Optionally, the driving sequence comprises a first additional state, and a second additional state, wherein in the first additional state the first port is coupled to the second port via a path comprising the second and third flying capacitors and the inductor, and wherein in the second additional state the ground port is coupled to the second port via a path comprising the second and third flying capacitors and the inductor.

Optionally, the driving sequence comprises another first state in which the ground port is de-coupled from the second port and wherein the first port is coupled to the second port via a path comprising the inductor.

Optionally, the power converter further comprises a current sensor for sensing an inductor current through the inductor, wherein the driver is adapted to open the second switch during the second state upon sensing that the inductor current has reached a threshold value. For instance, the threshold value may be a null current value.

Optionally, the power converter is a step-down converter, the first state being a magnetization state and the second state being a de-magnetization state.

Optionally, the power converter is a step-up converter, the first state being a de-magnetization state and the second state being a magnetization state.

According to a second aspect of the disclosure, there is provided a method of converting power with a target conversion ratio, the method comprising providing a power converter having a ground port, a first port, and a second port, wherein when the power converter operates as a step-down converter the first port receives an input voltage and the second port provides the output voltage and when the power converter operates as a step-up converter the second port receives an input voltage and the first port provides the output voltage; the power converter comprising a first flying capacitor coupled to a network of switches, an inductor coupled to the second port, and a driver; the network of switches comprising a first switch to couple the first flying capacitor to the first port; a second switch to couple the inductor to ground; driving the network of switches with a sequence of states during a drive period, the sequence of states comprising a first state and a second state, wherein in the first state the ground port is coupled to the second port via a first path comprising the first flying capacitor and the inductor, and the first port is decoupled from the second port, wherein in the second state the ground port is coupled to second port via a second path comprising the second switch and the inductor, and wherein the first port is coupled to the second port via a third path comprising the first flying capacitor while bypassing the inductor.

The options described with respect to the first aspect of the disclosure are also common to the second aspect of the disclosure.

According to a third aspect of the disclosure there is provided a power converter for providing an output voltage with a target conversion ratio, the power converter having a ground port, a first port, and a second port, wherein when the power converter operates as a step-down converter the first port receives an input voltage and the second port provides the output voltage and when the power converter operates as a step-up converter the second port receives an input voltage and the first port provides the output voltage, the power converter comprising a first flying capacitor coupled to a network of switches, a second flying capacitor coupled to the network of switches, an inductor coupled to the second port, and a driver; the network of switches comprising a first switch to couple the second flying capacitor to the first port; a ground switch to couple the inductor to ground; a first capacitor switch coupled to the first flying capacitor; the driver being adapted to drive the network of switches with a sequence of states during a drive period, the sequence of states comprising a first state and a second state, wherein in the first state the ground port is coupled to the second port via a first path comprising the first flying capacitor and the inductor, and wherein the first port is coupled to the second port via a second path comprising the first switch, the second flying capacitor and the inductor, wherein in the second state the ground port is coupled to the second port via a third path comprising the ground switch and the inductor, and wherein one of the first port and the ground port is coupled to the second port via a fourth path comprising the first flying capacitor while bypassing the inductor.

Optionally, in the second state the first port is decoupled from the second port and wherein the fourth path comprises the second flying capacitor.

Optionally, in the second state the ground port is coupled to the second port via a fifth path comprising the second flying capacitor, while bypassing the inductor.

Optionally, the inductor has a first terminal coupled to the first flying capacitor via a first inductor switch, and a second terminal connected to the second port, and wherein the first flying capacitor is coupled to the second port via a second capacitor switch.

Optionally, the second flying capacitor is coupled to the second port via a third capacitor switch.

Optionally, the power converter further comprises a current sensor for sensing an inductor current through the inductor, wherein the driver is adapted to open the ground switch during the second state upon sensing that the inductor current has reached a threshold value. For instance, the threshold value may be a zero current value.

Optionally, the power converter is a step-down converter, the first state being a magnetization state and the second state being a de-magnetization state.

Optionally, the power converter is a step-up converter, the first state being a de-magnetization state and the second state being a magnetization state.

According to a fourth aspect of the disclosure, there is provided a method of converting power with a target conversion ratio, the method comprising providing a power converter having a ground port, a first port, and a second port, wherein when the power converter operates as a step-down converter the first port receives an input voltage and the second port provides the output voltage and when the power converter operates as a step-up converter the second port receives an input voltage and the first port provides the output voltage, the power converter further comprising a first flying capacitor coupled to a network of switches, a second flying capacitor coupled to the network of switches, an inductor coupled to the second port, and a driver; wherein the network of switches comprises a first switch to couple the second flying capacitor to the first port; a ground switch to couple the inductor to ground; a first capacitor switch coupled to the first flying capacitor; driving the network of switches with a sequence of states during a drive period, the sequence of states comprising a first state and a second state, wherein in the first state the ground port is coupled to the second port via a first path comprising the first flying capacitor and the inductor, and wherein the first port is coupled to the second port via a second path comprising the first switch, the second flying capacitor and the inductor, wherein in the second state the ground port is coupled to the second port via a third path comprising the ground switch and the inductor, and wherein one of the first port and the ground port is coupled to the second port via a fourth path comprising the first flying capacitor while bypassing the inductor.

Optionally, in the second state the first port is decoupled from the second port and wherein the fourth path comprises the second flying capacitor.

Optionally, in the second state the ground port is coupled to the second port via a fifth path comprising the second flying capacitor, while bypassing the inductor.

The options described with respect to the third aspect of the disclosure are also common to the fourth aspect of the disclosure.

BRIEF DESCRIPTION OF THE DRAWINGS

The disclosure is described in further detail below by way of example and with reference to the accompanying drawings, in which.

DETAILED DESCRIPTION

Figure 1A:
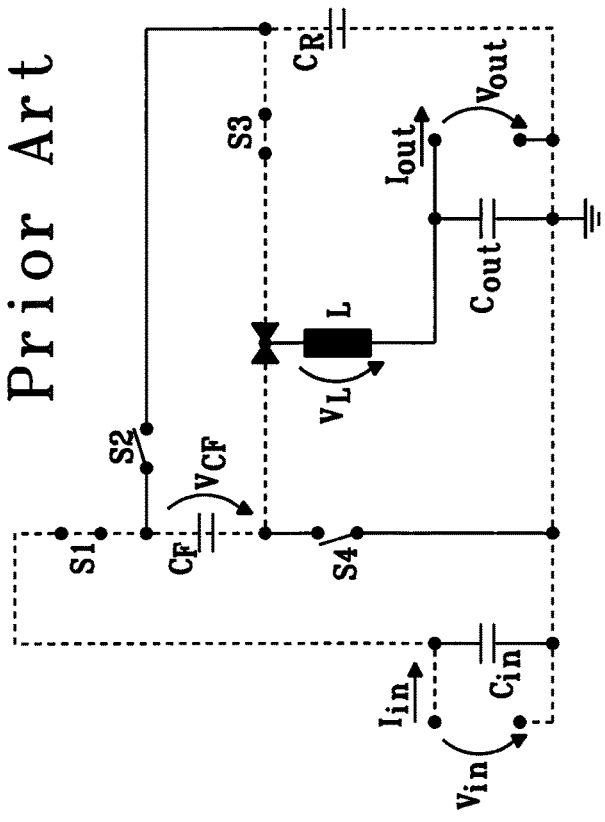
FIG. 1A is a diagram of a two-level Buck converter.
Figure 1B:
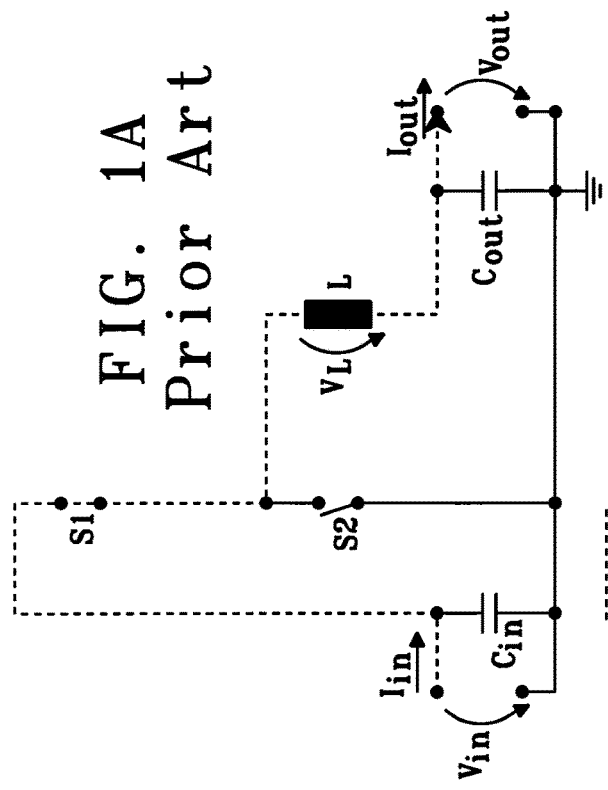
FIG. 1B is a diagram of a three-level Buck converter.

FIGS. 1A and 1B show the topologies of traditional two-levels and three-levels Buck converters. The two-level Buck converter provides an output current alternatively from the input terminal and the ground terminal. Consequently, the level of pulsed input current $I_{IN}$ (during inductor magnetization) is equal to the load current $I_{OUT}$ (zero otherwise):

$$\frac{I_{IN}}{I_{OUT}} = 1 \qquad (1)$$

$$D \in [0, 1]$$

For the 3-level Buck converter, the flying capacitor $C_F$ may be regulated to $V_{CF}=V_{IN}/2$ so that the magnetization voltage across the inductor L is reduced towards $V_L=V_{IN}/2-V_{OUT}$.

Figure 1C:
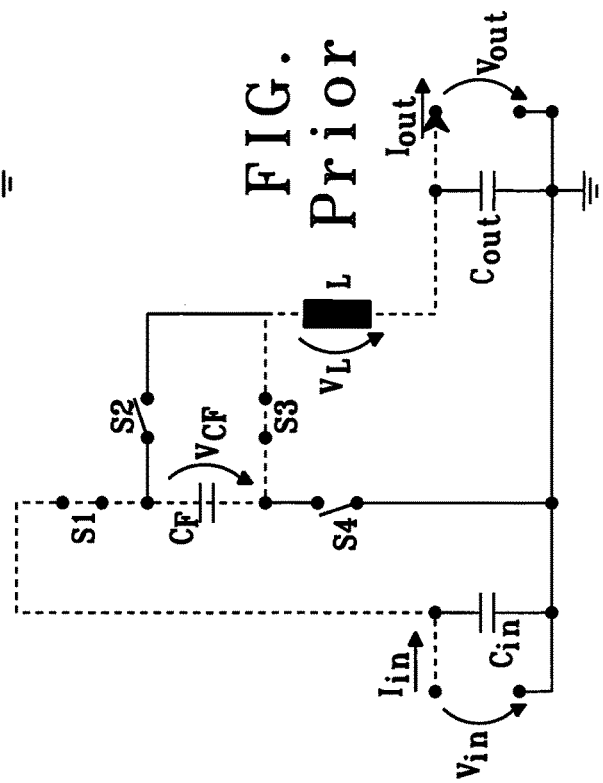
FIG. 1C is a diagram of a combined Buck converter and capacitive divider.

FIG. 1C illustrates a combined Buck converter and capacitive voltage divider according to U.S. Pat. No. 8,427,113. In this example the flying capacitor $C_F$ and the reservoir capacitor $C_R$ are automatically charged to the same voltage $V_{CF}=V_{CR}=V_{IN}/2$. During the inductor magnetization state, the load current is supplied in parallel by the input terminal and the (charged) reservoir capacitor $C_R$, hence reducing the amplitude of input current pulses (discontinuous current) to ½ of the load current:

$$\frac{I_{IN}}{I_{OUT}} = \frac{1}{2} \qquad (2)$$

$$D \in [0, 1]$$

The above result describes a ratio of average currents during the period of inductor magnetization (neglecting impact from inductor current ripple). The relationship between input and output voltages is obtained by applying the volt-sec balance principle to the voltage of the inductor during the inductor magnetization switching state DP and the inductor demagnetization switching state DV:

$$\frac{V_{OUT}}{V_{IN}} = \frac{D}{2} \quad (3)$$

$$DP = D, DV = 1 - D$$

$$D \in [0, 1]$$

From equation (3) one can derive a theoretical maximum voltage conversion ratio a $V_{OUT}/V_{IN}=1/2$ for D=1, in which D is the duty cycle of the inductor magnetization state that connects the input to the output port of the converter. However, for D=1 there is zero time available to re-distribute the charge from flying capacitor $C_F$ into the reservoir capacitor $C_R$ as this would require an infinite current causing a corresponding infinite $I^2R$ conduction loss. A more balanced current distribution is achieved by restricting the duty cycle to a value smaller than 1, for instance D≤3/4, resulting into a practical maximum voltage conversion ratio of $V_{OUT}/V_{IN}=3/8$ for D=3/4.

Figure 1D:
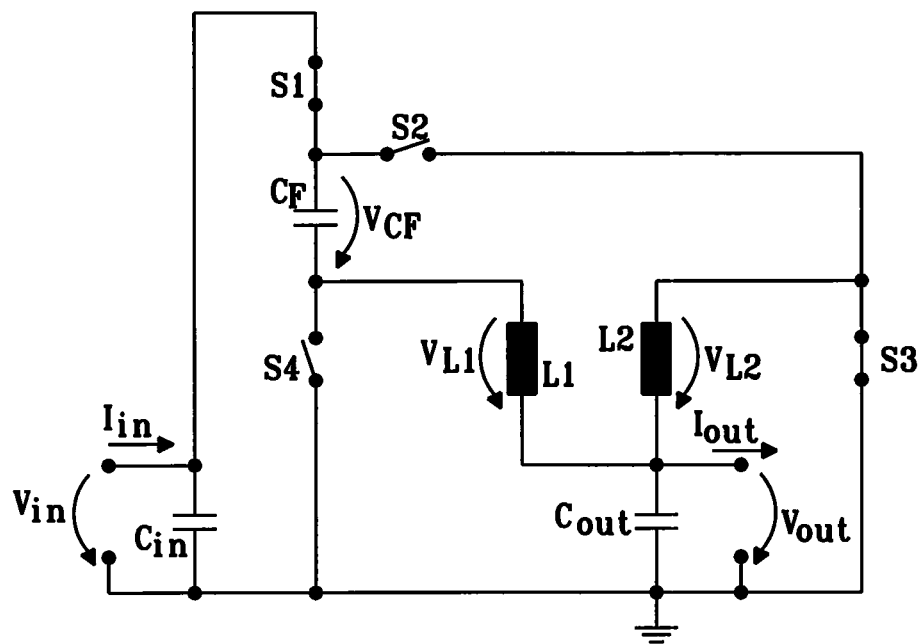
FIG. 1D is a diagram of a multiphase Buck converter.

FIG. 1D shows a diagram of a hybrid multiphase Buck converter, also referred to as a series capacitor Buck converter according to U.S. Pat. No. 7,230,405. In this example, during the magnetization (from the input terminal) of one inductor, half of the load current is provided via the second inductor (demagnetized from the ground terminal). As a result the amplitude of the current pulses generated at the input is reduced.

$$\frac{I_{IN}}{I_{OUT}} = \frac{1}{2} \quad (4)$$

$$D \in [0, 0.5]$$

The flying capacitor may be regulated to $V_{CF}=V_{IN}/2$, so that the relation between input and output voltages follows equation (3). However, for a balanced inductor load current the maximum possible duty cycle is reduced to D=0.5:

$$\frac{V_{OUT}}{V_{IN}} = \frac{D}{2} \quad (5)$$

$$DP = D, DV = 1 - D$$

$$D \in [0, 0.5]$$

This corresponds to a maximum voltage conversion ratio of $V_{OUT}/V_{IN}=1/4$ for D=0.5.

Figure 1E:
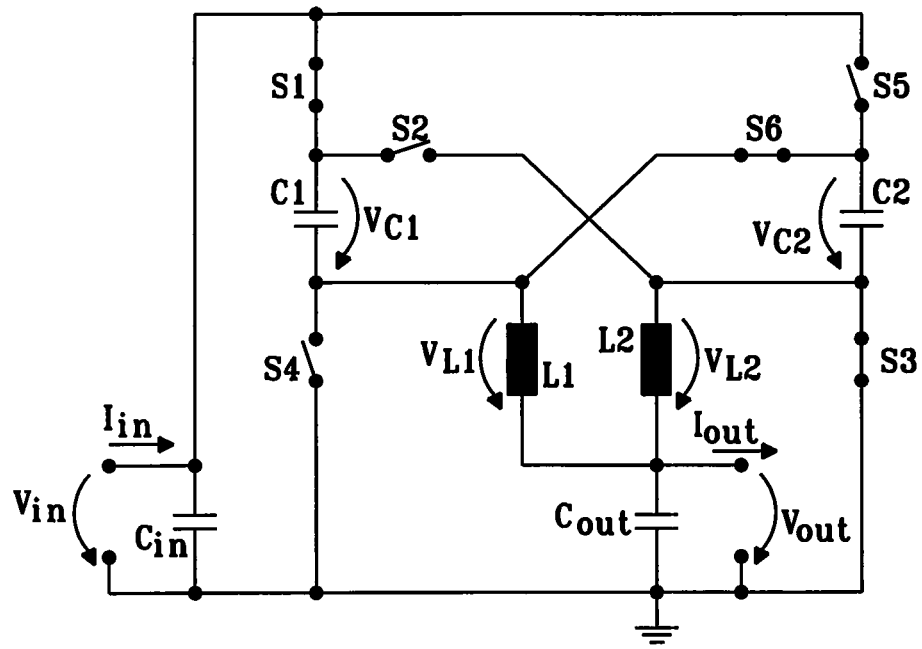
FIG. 1E is a diagram of another multiphase Buck converter.

FIG. 1E illustrates a derivative topology of the converter of FIG. 1D in which the two flying capacitors C1 and C2 are both regulated to $V_{C1}=V_{C2}=V_{IN}/2$, hence reducing the amplitude of input current pulses further down to:

$$\frac{I_{IN}}{I_{OUT}} = \frac{1}{4} \quad (6)$$

$$D \in [0, 0.5]$$

Figure 2:
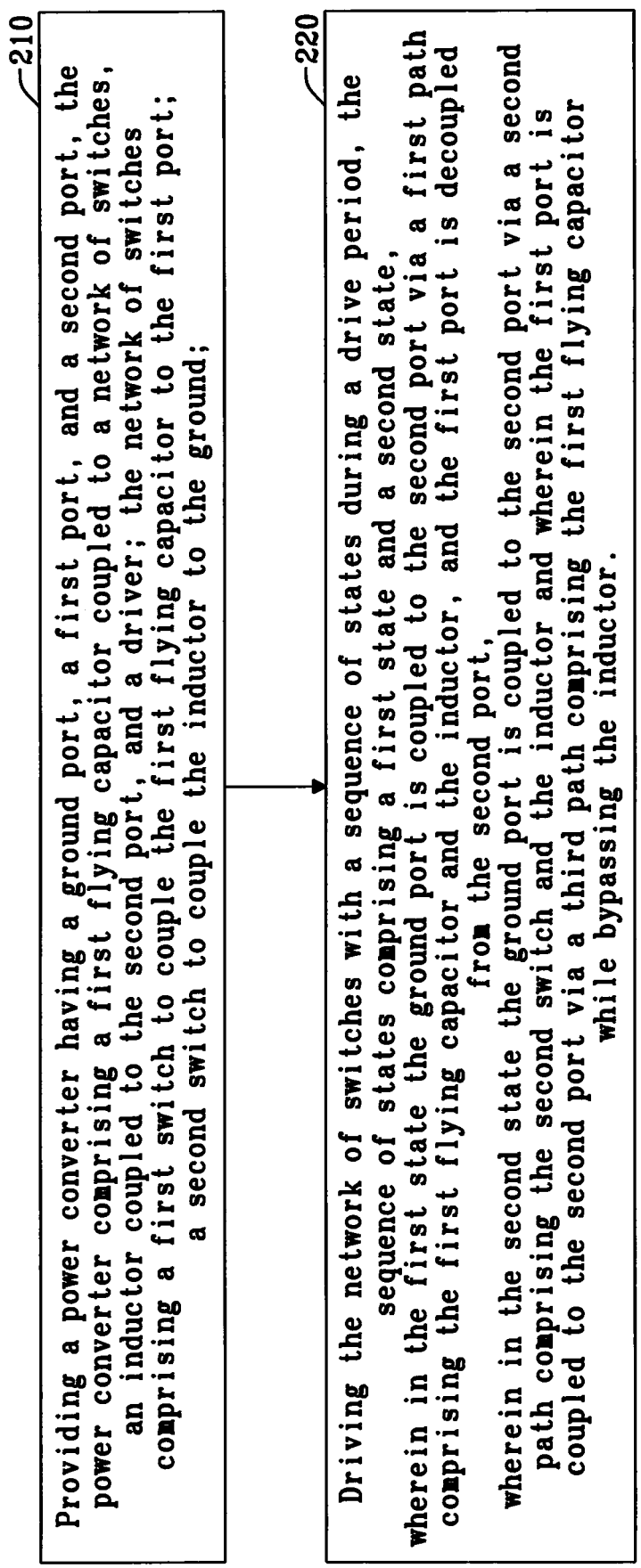
FIG. 2 is a flow chart of a method for providing a voltage with a input to output conversion ratio according to the disclosure.

FIG. 2 is a flow chart of a method for converting power with a target conversion ratio according to the disclosure.

At step 210 a power converter having a ground port, a first port, and a second port is provided. The power converter can operate either as a step-down converter or as a step-up converter. When the power converter operates as a step-down converter the first port receives an input voltage and the second port provides the output voltage. When the power converter operates as a step-up converter the second port receives an input voltage and the first port provides the output voltage. The power converter includes a first flying capacitor coupled to a network of switches, an inductor coupled to the second port, and a driver. The network of switches comprises a first switch to couple the first flying capacitor to the first port; a second switch to couple the inductor to ground.

At step 220 the network of switches is driven with a sequence of states that include a first state and a second state. In the first state the ground port is coupled to the second port via a first path comprising the first flying capacitor and the inductor, and the first port is decoupled from the second port. In the second state the ground port is coupled to second port via a second path comprising the second switch and the inductor, and wherein the first port is coupled to the second port via a third path comprising the first flying capacitor while bypassing the inductor.

As a result, in the first state there is no current flowing between the first port and the second port.

When the power converter operates as a step-down converter, the first state is a magnetization state and the second state is a de-magnetization state. Conversely, when the power converter operates as a step-up converter, the first state is a de-magnetization state and the second state is a magnetization state.

Optionally, a current sensor may be provided for sensing an inductor current through the inductor. Then the second switch may be opened during the second state upon sensing that the inductor current has reached a threshold value. This permits to disable current flowing from the output towards ground (negative inductor current) at low output current.

Using the method of FIG. 2 permits to deliver efficient power conversion especially for small step-down output-to-input voltage conversion ratio, for instance for $V_{OUT}/V_{IN}<1/4$, or for large step-up voltage conversion ratios. By implementing a capacitive current path bypassing the inductor, the losses due to the inductor DC resistance can be reduced hence improving converter efficiency and voltage regulation. In addition, the flying capacitor may act as supplement output capacitance, hence improving the response to transient load current.

Figure 3:
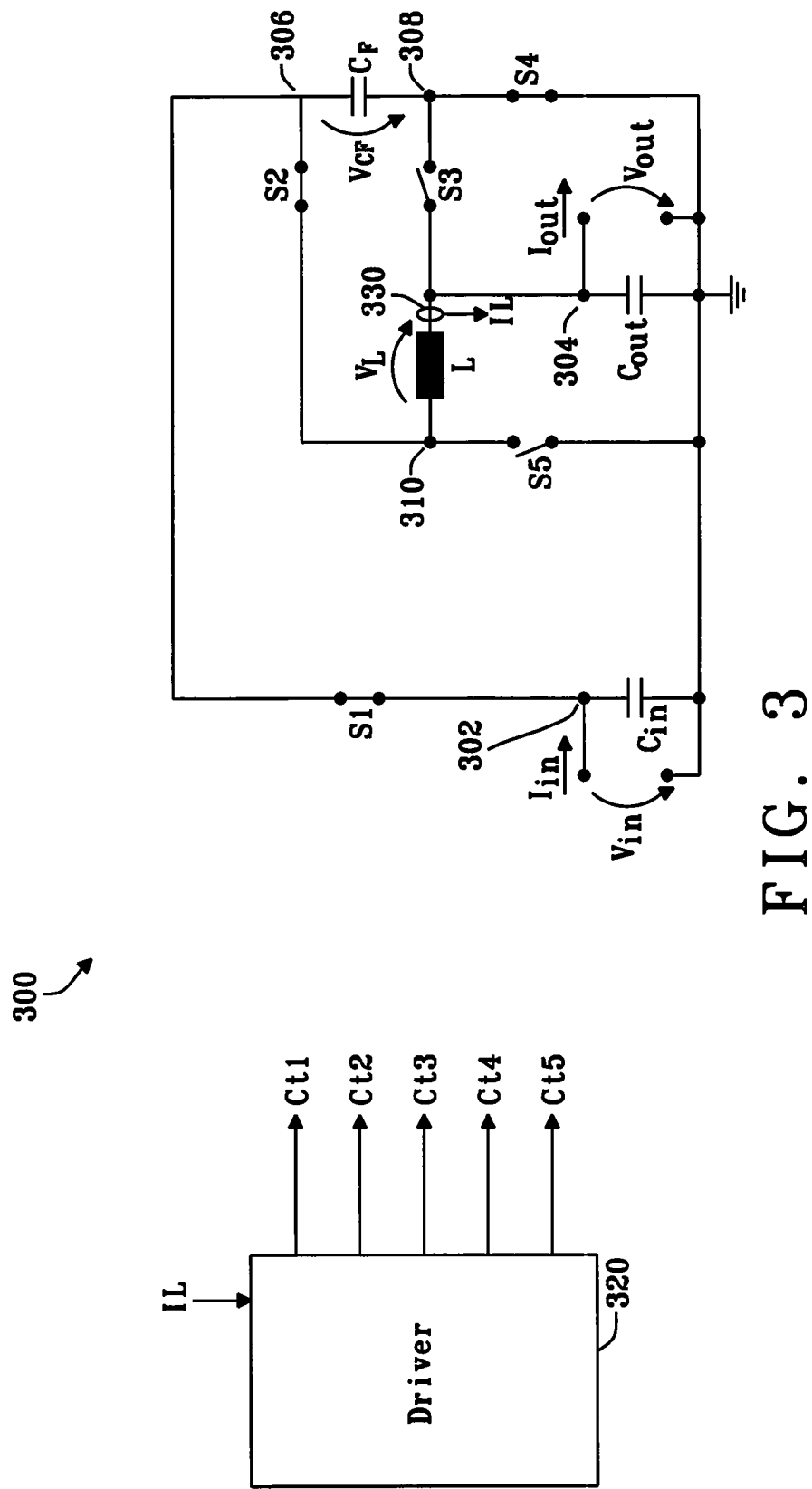
FIG. 3 is a diagram of a power converter for implementing the method of FIG. 2.

FIG. 3 is a diagram of a DC-DC converter 300 for implementing the method of FIG. 2. The DC-DC converter 300 includes an inductor L and a flying capacitor $C_F$ coupled between a first port (input node 302) and a second port (output node 304) by a network of switches formed of five switches S1, S2, S3, S4, S5. An input capacitor Cin is provided between the input node 302 and ground and an output capacitor Cout is provided between the output node 304 and ground. The capacitors Cin and Cout are connected to a fixed ground voltage and may be referred to as reservoir capacitors. The capacitor $C_F$ has terminals provided with varying voltages and may be referred to as a flying capacitor.

The flying capacitor $C_F$ is coupled to the input node 302 via a first switch, the input switch S1, and to ground via the ground switch S4. The flying capacitor $C_F$ has a first terminal coupled to node 306 and a second terminal coupled to node 308. In addition, the second terminal of capacitor $C_F$ is coupled to the output node 304 via the switch S3. The inductor L has a first terminal at node 310 and a second terminal coupled to the output node 304. The first inductor terminal is coupled to ground via the switch S5 (which may be referred to as de-magnetization switch) and to $C_F$ via the first inductor switch S2 at node 306. The second inductor terminal is coupled to the output node 304.

A driver 320 is provided to generate a plurality of control signals Ct1, Ct2, Ct3, Ct4, Ct5 to operate the switches S1-S5 respectively. The driver 320 is adapted to operate the DC-DC converter 300 with a sequence of states. The sequence of states may include a magnetization state to magnetize the inductor and a de-magnetization state to de-magnetize the inductor. The driver may be configured to maintain the magnetization state and the de-magnetization state for a predetermined duration during the drive period. For instance, a duty cycle of the magnetization state and a duty cycle of the de-magnetization state may be selected to achieve a target conversion ratio.

Figure 4A:
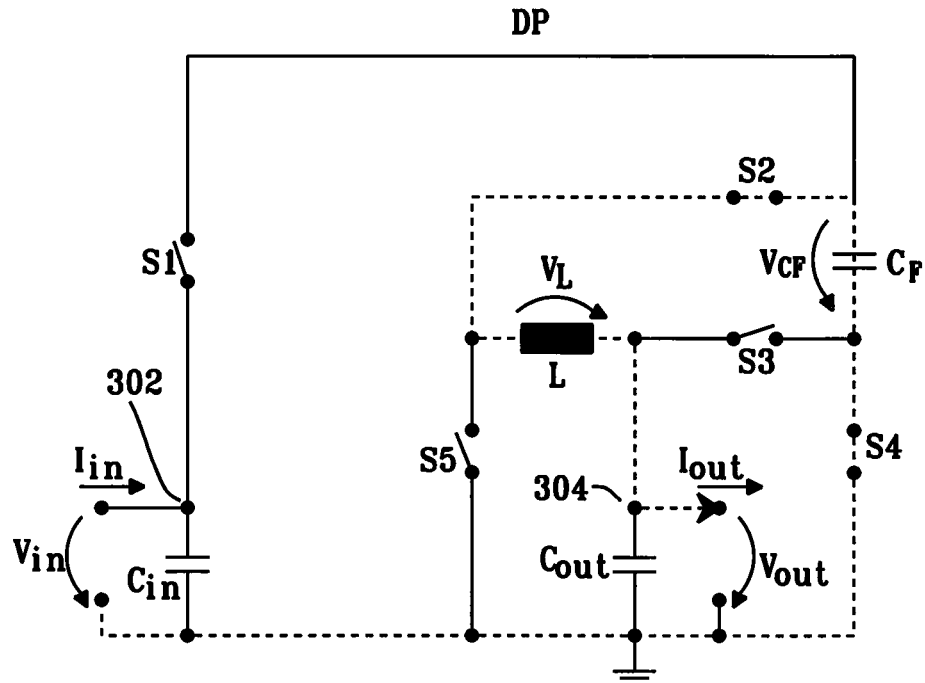
FIG. 4A is a diagram of a magnetization state for operating the power converter of FIG. 3.

FIG. 4A illustrates the DC-DC converter of FIG. 3 operating in a magnetization state DP, in which the switches S2, and S4 are closed while the remaining switches S1, S3 and S5 are open. The input node 302 is decoupled or disconnected from the output node 304. The ground is coupled to the output node 304 via a path that includes the S4, $C_F$, S2, and the inductor L.

Figure 4B:
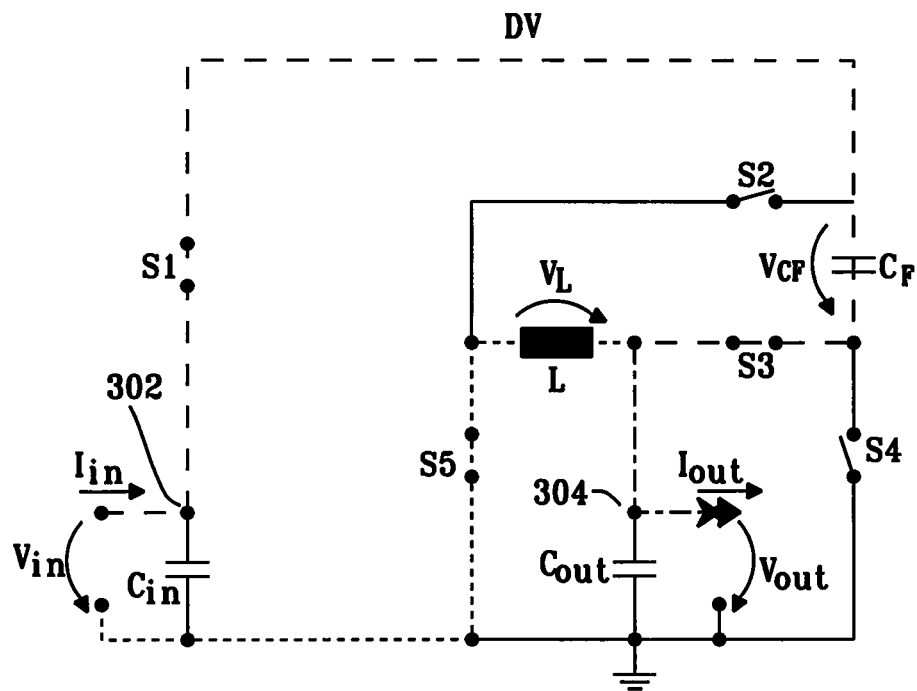
FIG. 4B is a diagram of a de-magnetization state for operating the power converter of FIG. 3.

FIG. 4B illustrates the DC-DC converter of FIG. 3 operating in a de-magnetization state DV, in which the switches S1, S3, and S5 are closed while the remaining switches S2, and S4 are open. The input node 302 is coupled to the output node 304 via an input path that includes $C_F$ and S3 and bypasses the inductor L. The ground is coupled to the output node 304 via a de-magnetization path including S5 and the inductor L.

In operation the DC-DC power converter of FIG. 3 pulls no current from the input terminal during inductor magnetization (see FIG. 4A). A current is pulled from the input terminal during the inductor demagnetization switching state (see FIG. 4B).

A ratio of average input to output currents during the duty cycle $D_V$ of the de-magnetization state DV can be expressed as:

$$\frac{I_{IN}}{I_{OUT}} = \frac{D}{(1+D)(1-D)} \text{ during } D_V = 1-D \qquad (7)$$

$$D \in [0, 1]$$

In which D is the duty cycle of the magnetization state and $D_V$ is the duty cycle of the de-magnetization state. For a duty cycle D<~0.618 (small output-to-input voltage conversion ratio) the level of the input current pulses $I_{IN}$ is less than the level of the load current $I_{OUT}$.

The flying capacitor is automatically charged to $V_{CF}=V_{IN}-V_{OUT}$ and the relationship between input and output voltage is obtained by applying the volt-sec balance principle to the voltage of the inductor:

$$\frac{V_{OUT}}{V_{IN}} = \frac{D}{1+D} \qquad (8)$$

$$D_P = D, D_V = 1-D$$

$$D \in [0, 1]$$

In which $D_F$ is the duty cycle of the magnetization state DP.

According to equation (8), the theoretical maximum converter voltage conversion ratio is $V_{OUT}/V_{IN}=1/2$ for D=1. However, for D=1, $D_V=0$ and there is no time available to re-distribute the charge from the flying capacitor CF into the output capacitor $C_{OUT}$ as this would require an infinite current causing a corresponding infinite $I^2R$ conduction loss.

Current re-distribution may be achieved by selecting a duty cycle less than 1, for instance D≤¾. For D=¾ a practical maximum voltage conversion ratio of $V_{OUT}/V_{IN}=3/7$ is achieved.

For applications requiring a voltage conversion ratio greater than $V_{OUT}/V_{IN}=3/7$ the inductor magnetization state DP of FIG. 4A may be replaced or used in combination with a modified magnetization state DP2.

Figure 4C:
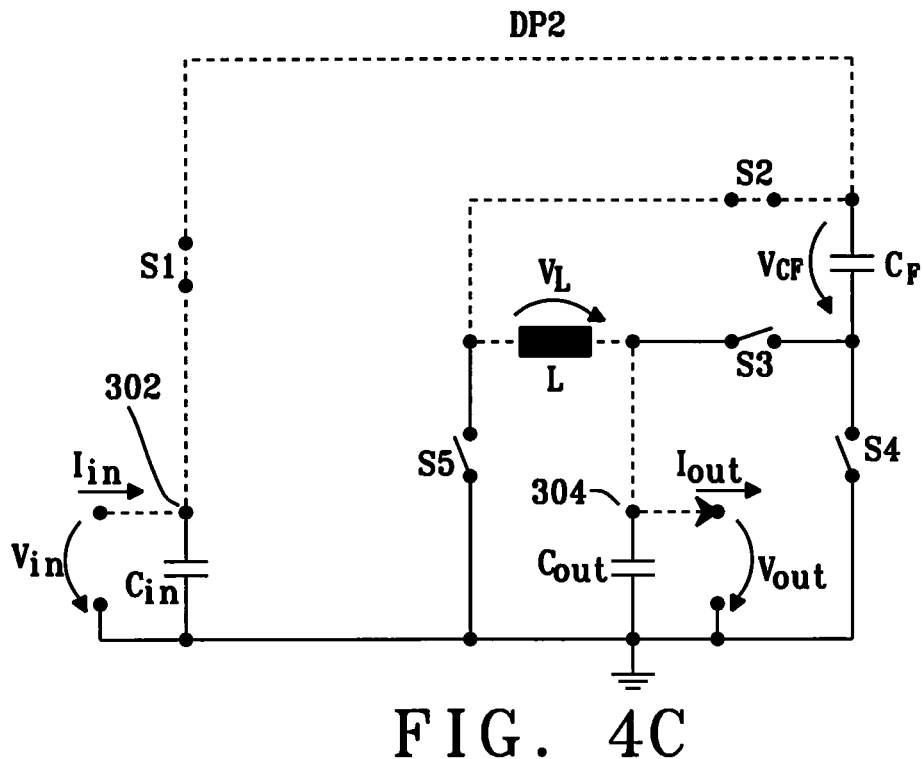
FIG. 4C is a diagram of another magnetization state for operating the power converter of FIG. 3.

FIG. 4C illustrates the DC-DC converter of FIG. 3 operating in a second magnetization state DP2, in which the switches S1 and S2 are closed while the remaining switches S3, S4 and S5 are open. The input node 302 is coupled to the output node 304 via a magnetization path that includes S1, S2 and the inductor L. The ground is not coupled to the output node 304.

When introducing the second magnetization state DP2 into the driving sequence at D>0.5, the relationship between input and output voltage may be expressed as:

$$\frac{V_{OUT}}{V_{IN}} = \frac{D}{2-D} \qquad (9)$$

$$D_{P2} = 2D-1, D_P = D_V = 1-D$$

$$D \in [0.5, 1]$$

In which $D_{P2}$ is the duty cycle of the second magnetization state DP2.

By increasing the duty cycle $D_{P2}$, the converter operation approximates that of a traditional buck with an extended maximum duty cycle of D=1, a maximum voltage conversion ratio of $V_{OUT}/V_{IN}=1$ and the amplitude of input current pulses approximating the level of the output current.

The efficiency of the DC-DC converter 300 may be improved for a low output current by preventing a reverse output current. This can be achieved using a modified demagnetization state DV'.

Figure 4D:
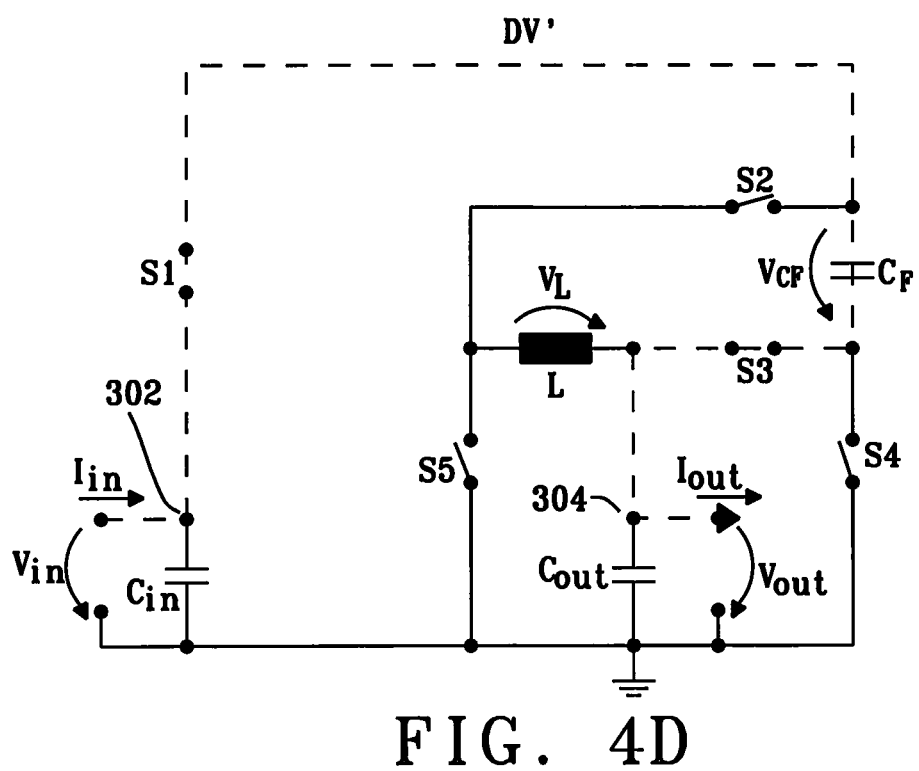
FIG. 4D is a diagram of another de-magnetization state for operating the power converter of FIG. 3.

FIG. 4D illustrates the DC-DC converter of FIG. 3 operating in a second de-magnetization state DV', in which the switches S1 and S3 are closed while the remaining switches S2, S4 and S5 are open. The input node 302 is coupled to the output node 304 via an input path that includes S1, $C_F$ and S3. The ground is not coupled to the output node 304.

The DC-DC converter 300 may be provided with a current sensor 330 (see FIG. 3) for sensing an inductor current IL through the inductor. The driver 320 can be configured to operate the converter in a so-called Discontinuous Conduction Mode (DCM) in which the converter stops provision of current until the output voltage has dropped below a threshold value. In this example the driver 320 is configured to open the de-magnetization switch S5 during the de-magnetization state DV upon sensing that the inductor current IL has reached a zero value. This may be achieved using a zero-cross comparator circuit. Therefore, the driver 320 drives the converter circuit with the second de-magnetization state DV' after the inductor current has fallen below zero. During the modified demagnetization state DV' the current through the inductor is discontinued, however the current through the flying capacitor is still provided to the output port.

Figure 5:
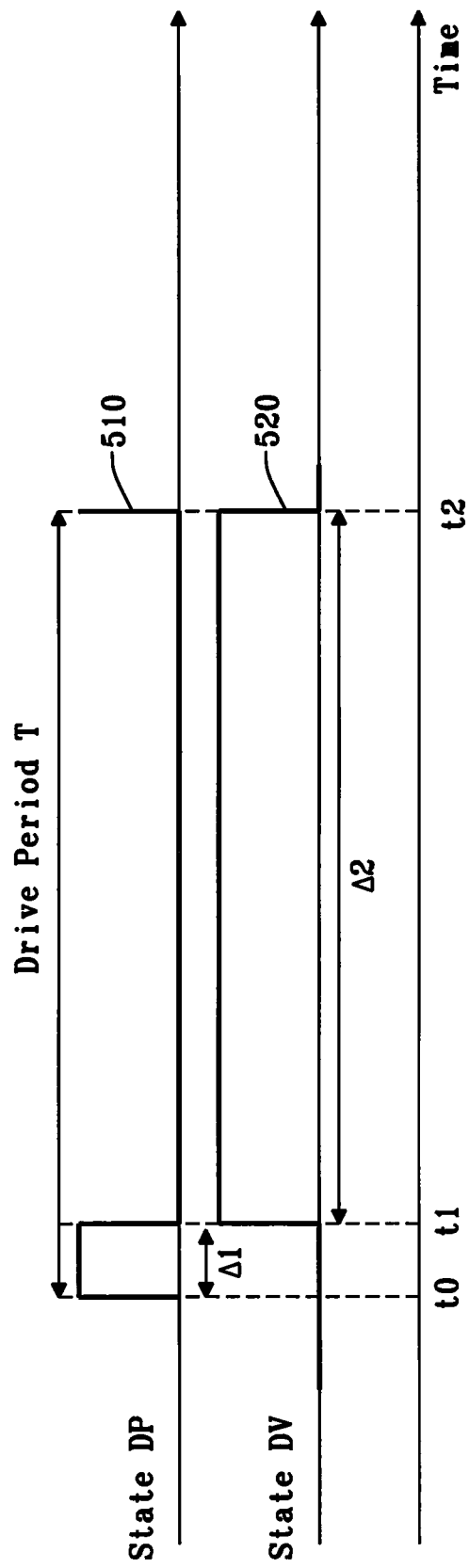
FIG. 5 is a plot of a drive sequence for operating the power converter of FIG. 3 with a specific conversion ratio.

FIG. 5 illustrates a drive sequence for operating the DC-DC converter of FIG. 3 with a conversion ratio $$\frac{V_{out}}{V_{in}} = \frac{1}{12}.$$

In this example, the driver 320 drives the DC-DC converter 300 with the magnetization state PD (waveform 510), between the times t0 and t1 for a duration Δ1, then with the de-magnetization state DV (waveform 520) between the time t1 and t2 for a duration Δ2. This sequence is then repeated over time to deliver the required output power. It will be appreciated that a delay also referred to as dead-time may be introduced at times t1 and t2.

For a voltage conversion ratio $V_{OUT}/V_{IN}=1/12$ the magnetization duty cycle is $D_P=1/11$. As a result, the input current is flowing nearly continuously (more than 90% duty cycle) and its level is less than 10% of the load current as derived from equation (7). Therefore, the amplitude of input current pulses is more than 10 times lower than that of a conventional buck or of a 3-level buck converter. At small voltage conversion ratios, the input current approximates continuous conduction at input current levels that scale with the voltage conversion ratio.

For small step-down voltage conversion ratios (large step-up voltage conversion ratios) there is a relatively long duty cycle during which the current flows from the input terminal to the output terminal. This extended duty cycle of input current reduces the input current level, hence reducing the amplitude of pulsed current and associated voltage ripples.

Figure 6:
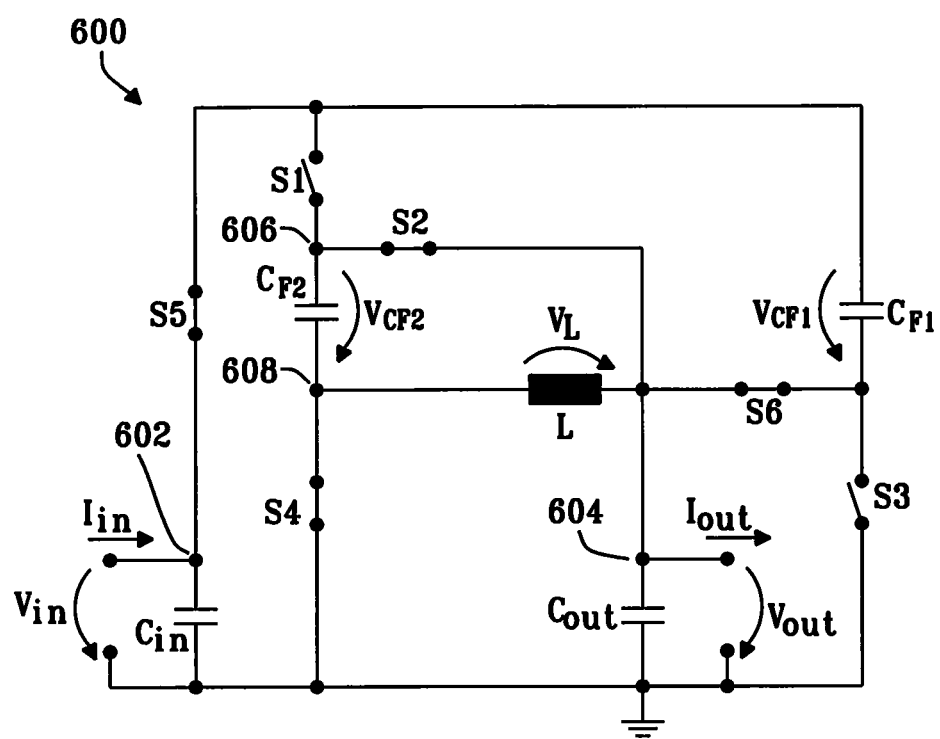
FIG. 6 is a diagram of another power converter for implementing the method of FIG. 2.

FIG. 6 is a diagram of another DC-DC converter 600 for implementing the method of FIG. 2. The DC-DC converter 600 includes an inductor L and two flying capacitors $C_{F1}$ and $C_{F2}$ coupled between a first port (input node 602) and a second port (output node 604) by a network of switches formed of six switches S1-S6. An input capacitor Cin is provided between the input node 602 and ground and an output capacitor Cout is provided between the output node 604 and ground.

The first flying capacitor $C_{F1}$ has a first terminal coupled to the input node 602 via the switch S5 (which may be referred to as input switch) and a second terminal coupled to ground via the ground switch S3. The second flying capacitor $C_{F2}$ has a first terminal at node 606 and a second terminal at node 608. The first terminal is coupled to the input node 602 via a capacitor switch S1 and the input switch S5. The second terminal is coupled to ground via the switch S4. The inductor L has a first terminal coupled to the second flying capacitor $C_{F2}$ at node 608 and a second terminal coupled to the output node 604. The first terminal of $C_{F2}$ is coupled to the output node 604 via switch S2. The inductor second terminal is coupled to the second terminal of $C_{F1}$ via switch S6. Therefore, the inductor L and the first and second flying capacitors $C_{F1}$, $C_{F2}$ are all connected to the output node 604, hence providing the option to split the output current across multiple parallel current paths.

A driver (not shown) is provided to generate six control signals Ct1-Ct6 to operate the switches S1-S6 respectively. The driver is adapted to operate the DC-DC converter 600 with a sequence of states. The sequence of states may include a magnetization state and a de-magnetization state. The driver may be configured to maintain the magnetization state and the de-magnetization state for a predetermined duration during the drive period. For instance, a duty cycle of the magnetization state and a duty cycle of the de-magnetization state may be selected to achieve a target conversion ratio.

Figure 7A:
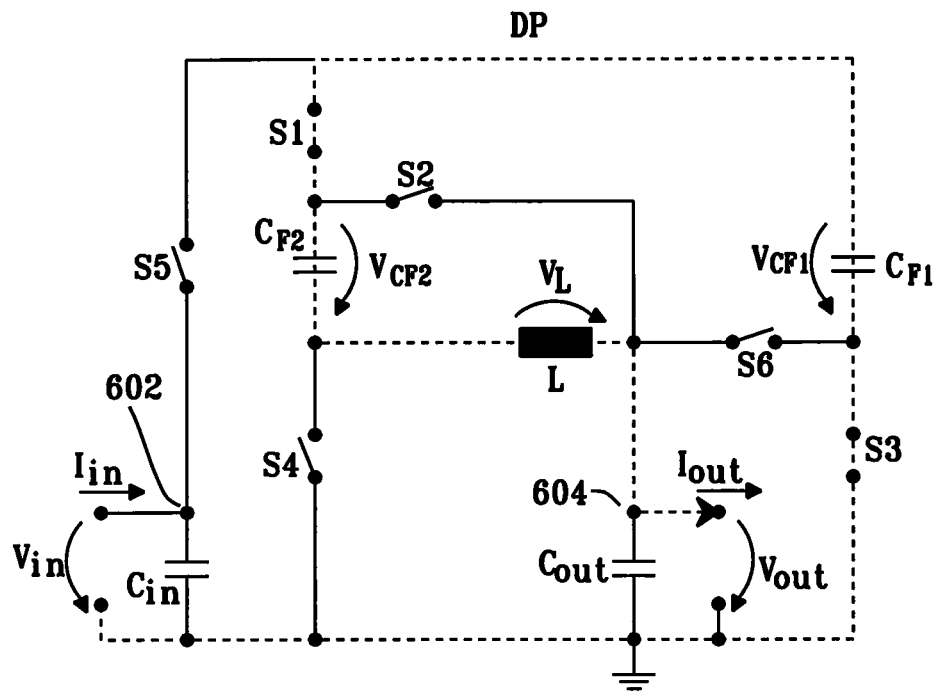
FIG. 7A is a diagram of a magnetization state for operating the power converter of FIG. 6.

FIG. 7A illustrates the DC-DC converter of FIG. 6 operating in a magnetization state DP, in which the switches S1 and S3 are closed while the remaining switches S2, S4, S5 and S6 are open. The input node 602 is decoupled or disconnected from the output node 604. The ground is coupled to the output node 604 via a path that includes S3, $C_{F1}$, S1, $C_{F2}$ and the inductor L.

Figure 7B:
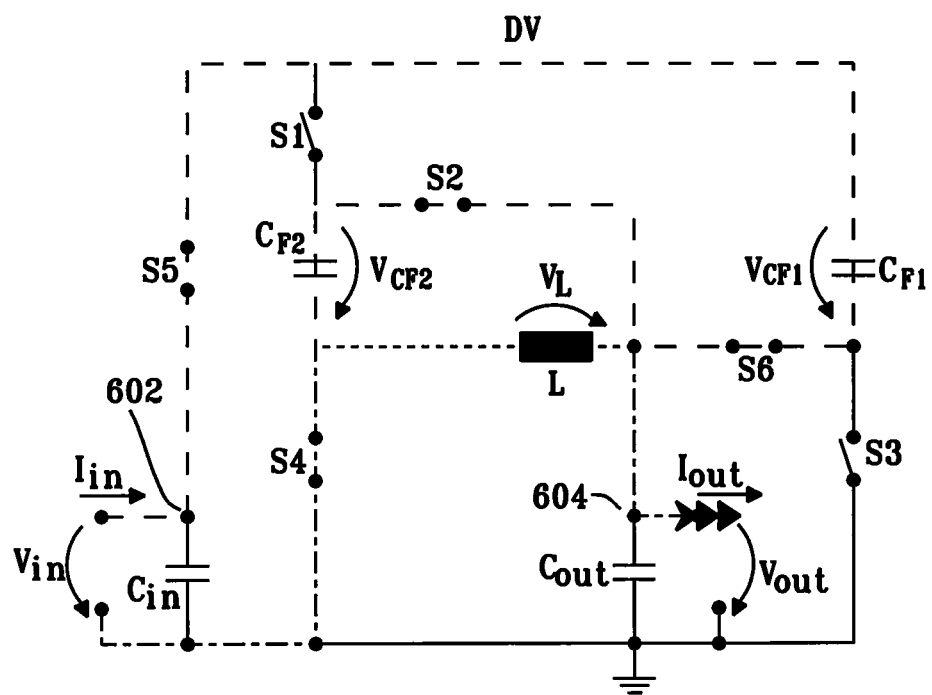
FIG. 7B is a diagram of a de-magnetization state for operating the power converter of FIG. 6.

FIG. 7B illustrates the DC-DC converter of FIG. 6 operating in a de-magnetization state DV, in which the switches S2, S4, S5 and S6 are closed while the remaining switches S1 and S3 are open. The input node 602 is coupled to the output node 604 via an input path that includes S5, $C_{F1}$, S6, which bypasses the inductor L. The ground is coupled to the output node 604 via two paths: a ground path and a de-magnetization path. The ground path includes S4, $C_{F2}$, S2 while bypassing L. The de-magnetization path includes S4 and the inductor L.

In operation the converter 600 automatically charges the flying capacitors to $V_{CF2}=V_{OUT}$ and $V_{CF1}=V_{IN}-V_{OUT}$ during the de-magnetization state DV and then connects $C_{F1}$ and $C_{F2}$ in series during the magnetization state DP. The second flying capacitor increases the share of current bypassing the inductor. The topology of converter 600 reduces further the amplitude of input current pulses, inductor current and loss due to the inductor DC resistance.

A ratio of average input to output currents during the duty cycle $D_V$ of the de-magnetization state DV can be expressed as:

$$\frac{I_{IN}}{I_{OUT}} = \frac{D}{(1+2D)(1-D)} \text{ during } D_V = 1-D \quad (10)$$
$$D \in [0, 1]$$

The relationship between input and output voltage is expressed as:

$$\frac{V_{OUT}}{V_{IN}} = \frac{D}{1+2D} \quad (11)$$
$$D_P = D, D_V = 1-D$$
$$D \in [0, 1]$$

For a voltage conversion ratio $V_{OUT}/V_{IN}=1/12$ the magnetization duty cycle is $D_P=1/10$. The amplitude of input current pulses $I_{IN}$ derived from equation (10) is just 5/54 of the load current $I_{OUT}$.

The theoretical maximum voltage conversion ratio derived from equation (11) is $V_{OUT}/V_{IN}=1/3$ for D=1. However, for D=1, $D_V=0$ and there is no time during the drive period to re-distribute the charge from flying capacitors $C_{F1}$ and $C_{F2}$ into the output capacitor $C_{OUT}$ as this would require an infinite current causing a corresponding infinite $I^2R$ conduction loss. Current distribution may be achieved by restricting the duty cycle to a value less than 1, for instance D≤3/4. For D=3/4 a practical maximum voltage conversion ratio of $V_{OUT}/V_{IN}=3/10$ is achieved.

Higher output voltages may be achieved by inserting a modified magnetization state DP2 to the driving sequence.

Figure 7C:
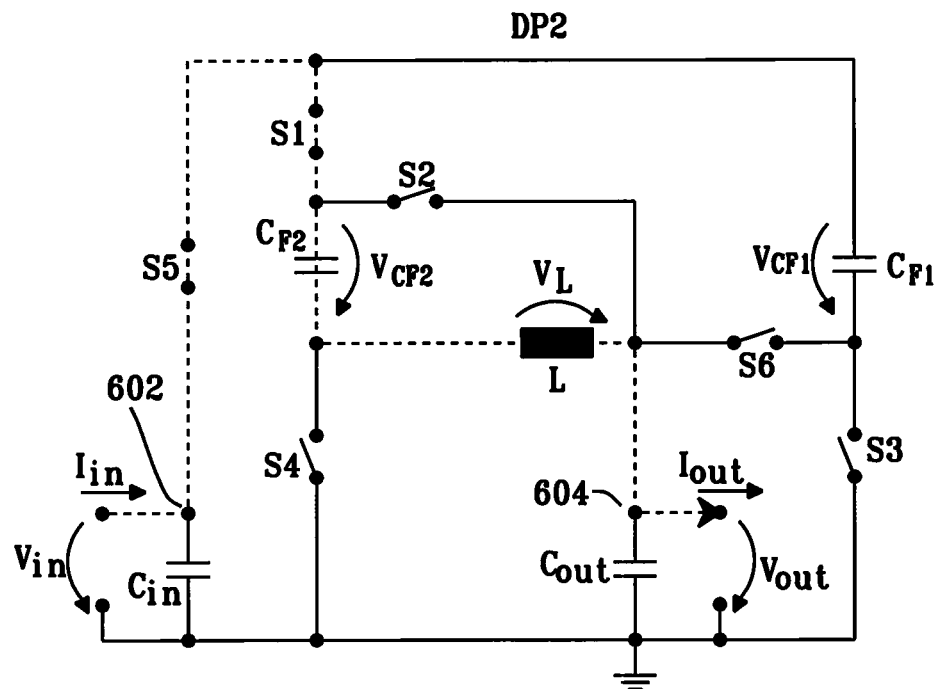
FIG. 7C is a diagram of another magnetization state for operating the power converter of FIG. 6.

FIG. 7C illustrates the DC-DC converter of FIG. 6 operating in a second magnetization state DP2, in which the switches S1 and S5 are closed while the remaining switches S2, S3, S4 and S6 are open. The ground node is decoupled from the output node 604. The input node 602 is coupled to the output node 604 via a path that includes S5, S1, $C_{F2}$ and the inductor L.

The second magnetization state DP2 introduces an inductor magnetization current from the input port through the second flying capacitor. Restricting the duty cycle to e.g. D≤3/4, increases the practical maximum voltage conversion ratio to $V_{OUT}/V_{IN}=3/8$ for D=3/4.

$$\frac{V_{OUT}}{V_{IN}} = \frac{D}{2} \quad (12)$$

$$D_{P2} = 2D - 1, D_P = D_V = 1 - D$$

$$D \in [0.5, 0.75]$$

The topology of the converter of FIG. 6 improves conversion efficiency by minimizing conduction losses in the converter and the external components (inductor DCR, capacitor ESR), but also by reducing inductor core loss. In addition, the voltage drop from the flying capacitors also enables the use of switches, for instance power FETs, with a reduced voltage rating. For example, the inductor de-magnetization switch S4 may be implemented with a reduced voltage rating. This improves the figure of merit of the switches (smaller internal transistor resistance Ron and smaller gate capacitance).

Figure 8:
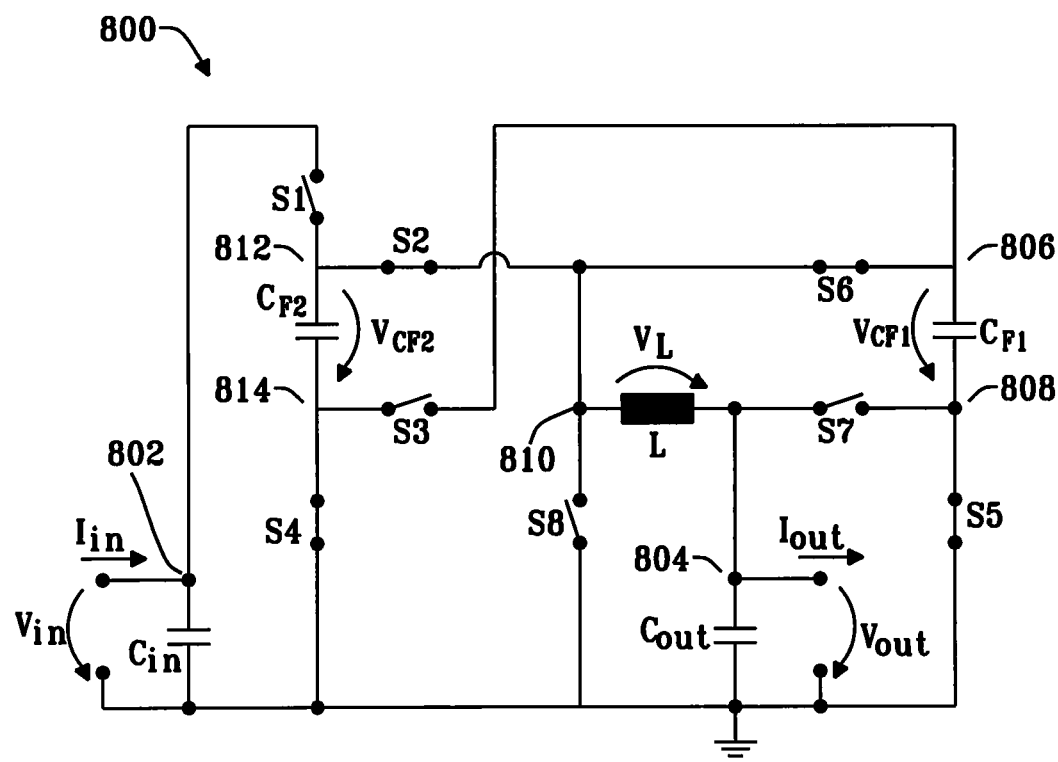
FIG. 8 is a diagram of another power converter for implementing the method of FIG. 2.

FIG. 8 is a diagram of another DC-DC converter 800 for implementing the method of FIG. 2. The converter 800 can be implemented with power switches having a relatively low voltage rating for instance a voltage rating close to half the input voltage. The DC-DC converter 800 includes an inductor L and two flying capacitors $C_{F1}$ and $C_{F2}$ coupled between a first port (input node 802) and a second port (output node 804) by a network of switches formed of eight switches S1-S8. An input capacitor Cin is provided between the input node 802 and ground and an output capacitor Cout is provided between the output node 804 and ground.

The first flying capacitor $C_{F1}$ has a first terminal at node 806 coupled to $C_{F2}$ via the capacitor switch S3 and a second terminal at node 808 coupled to ground via the ground switch S5. The inductor L has a first terminal at node 810 and a second terminal coupled to the output node 804. The first inductor terminal is coupled to ground via the switch S8 (which may be referred to as de-magnetization switch) and to $C_{F1}$ via the first inductor switch S6 at node 806. The second inductor terminal is coupled to the output node 804 and to $C_{F1}$ via the second capacitor switch S7 at node 808. The second flying capacitor $C_{F2}$ has a first terminal at node 812 coupled to the input terminal via the input switch S1 and a second terminal at node 814 coupled to ground via the ground switch S4. The first terminal of $C_{F2}$ is coupled to the first terminal of the inductor via the capacitor switch S2. A driver (not shown) is provided to generate eight control signals Ct1-Ct8 to operate the switches S1-S8 respectively. The driver is adapted to operate the DC-DC converter 800 with a sequence of states. The sequence of states may include a magnetization state and a de-magnetization state. The driver may be configured to maintain the magnetization state and the de-magnetization state for a predetermined duration during the drive period. For instance, a duty cycle of the magnetization state and a duty cycle of the de-magnetization state may be selected to achieve a target conversion ratio.

Figure 9A:
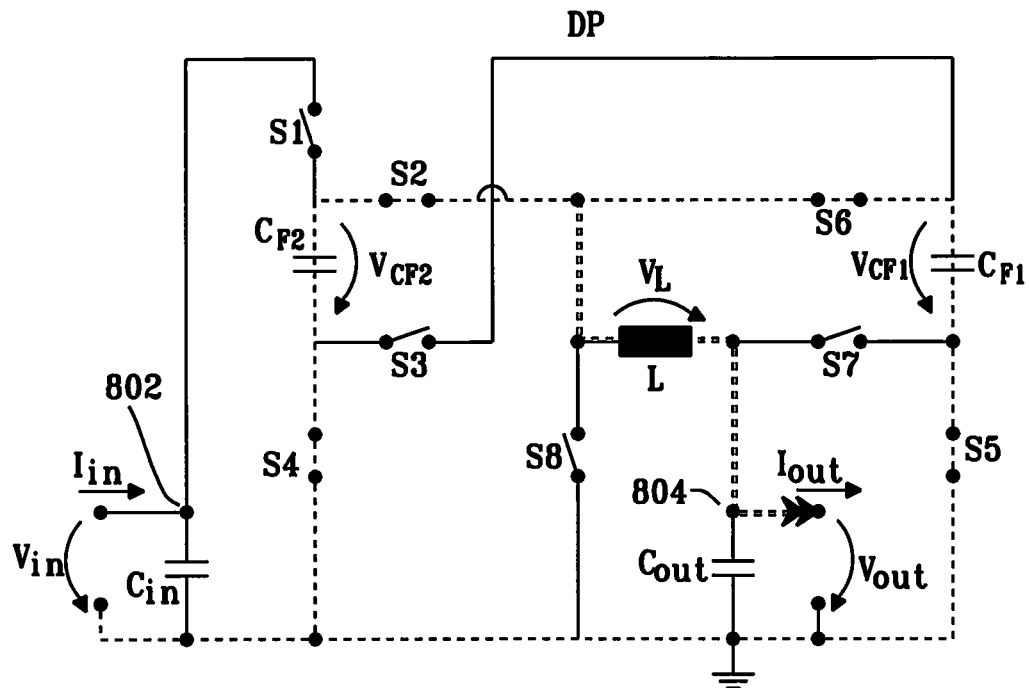
FIG. 9A is a diagram of a magnetization state for operating the power converter of FIG. 8.

FIG. 9A illustrates the DC-DC converter of FIG. 8 operating in a magnetization state DP, in which the switches S2, S4, S5 and S6 are closed while the remaining switches S1, S3, S7 and S8 are open. The input node 802 is decoupled or disconnected from the output node 804. The ground is coupled to the output node 804 via a first magnetization path that includes S5, $C_{F1}$, S6 and the inductor L; and a second magnetization path that includes S4, $C_{F2}$, S2 and the inductor L.

Figure 9B:
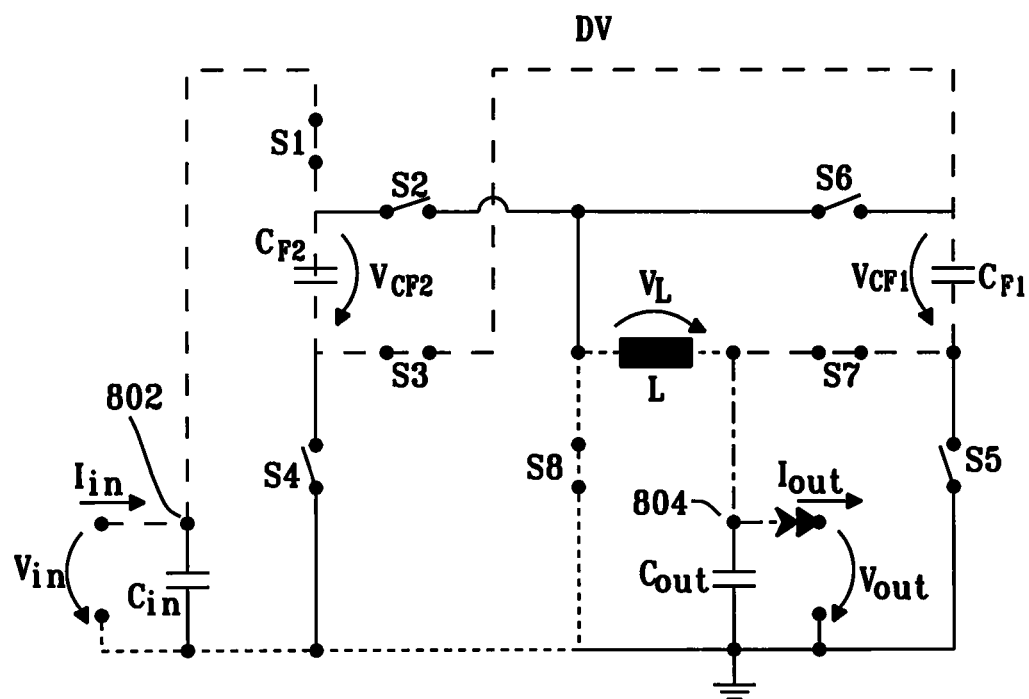
FIG. 9B is a diagram of a de-magnetization state for operating the power converter of FIG. 8.

FIG. 9B illustrates the DC-DC converter of FIG. 8 operating in a de-magnetization state DV, in which the switches S1, S3, S7 and S8 are closed while the remaining switches S2, S4, S5 and S6 are open. The input node 802 is coupled to the output node 804 via an input path that includes S1, CF2, S3, CF1 and that bypasses the inductor L. The ground is coupled to the output node 804 via a de-magnetization path that includes S8 and the inductor L.

In operation the flying capacitors $C_{F1}$ and $C_{F2}$ are alternatively connected in series (during the de-magnetization state DV) and in parallel (during the magnetization state DP). The flying capacitors $C_{F1}$ and $C_{F2}$ are automatically charged to $V_{CF1}=V_{CF2}=(V_{IN}-V_{OUT})/2$.

A ratio of average input to output currents during the duty cycle $D_V$ of the de-magnetization state DV can be expressed as:

$$\frac{I_{IN}}{I_{OUT}} = \frac{D}{(2+D)(1-D)} \text{ during } D_V = 1 - D \quad (13)$$

$$D \in [0, 1]$$

The relationship between input and output voltage is expressed as:

$$\frac{V_{OUT}}{V_{IN}} = \frac{D}{2+D} \quad (14)$$

$$D_P = D, D_V = 1 - D$$

$$D \in [0, 1]$$

By combining equations 13 and $$14 \frac{I_{IN}}{I_{OUT}} = \frac{V_{OUT}}{V_{IN}} \frac{1}{(1-D)}.$$

As a result, the level of input current scales with the product of the voltage conversion ratio with 1/(1−D).

For a voltage conversion ratio $V_{OUT}/V_{IN}=1/12$ the magnetization duty cycle is $D_F=2/11$. The amplitude of input current pulses $I_{IN}$ derived from equation (13) is just ~10% (11/108) of the load current $I_{OUT}$.

The theoretical maximum voltage conversion ratio derived from equation (14) is $V_{OUT}/V_{IN}=1/3$ for D=1. However, for D=1, there is no time during the drive period $D_V=0$ to re-distribute the charge from flying capacitors $C_{F1}$ and $C_{F2}$ into the output capacitor $C_{OUT}$ as this would require an infinite current causing a corresponding infinite $I^2R$ conduction loss. Current distribution may be achieved by restricting the duty cycle to a value less than 1, for instance D≤3/4. For D=3/4 a practical maximum voltage conversion ratio of $V_{OUT}/V_{IN}=3/11$ is achieved.

Figure 10:
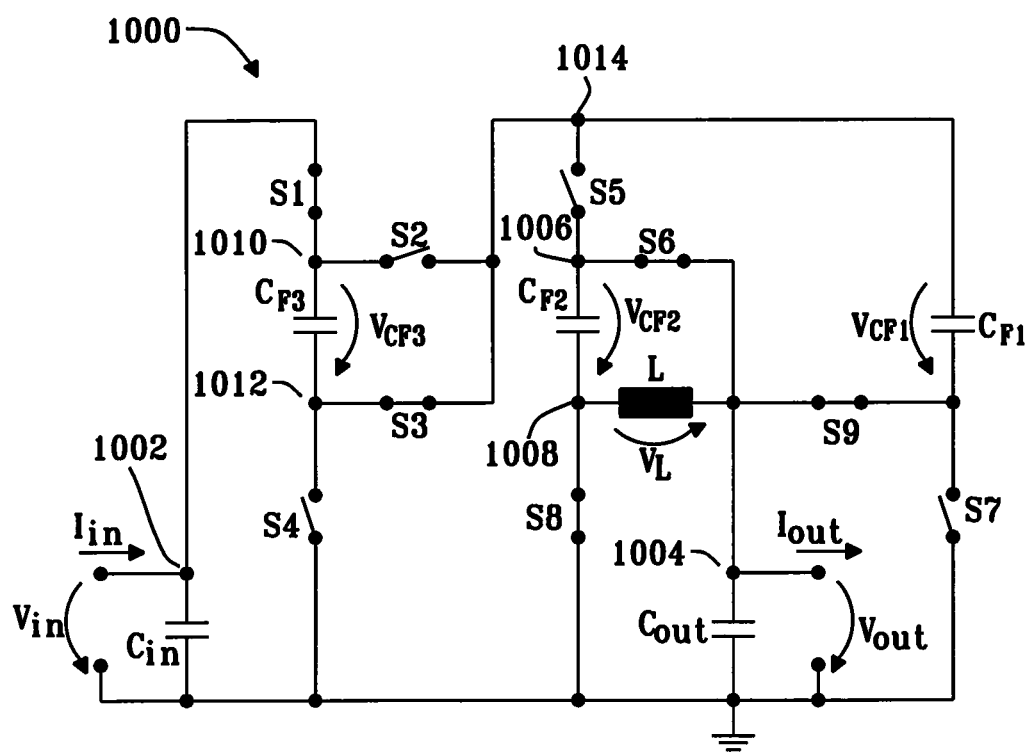
FIG. 10 is a diagram of another power converter for implementing the method of FIG. 2.

FIG. 10 is a diagram of another DC-DC converter 1000 for implementing the method of FIG. 2. The converter 1000 is designed for operating at very small voltage conversion ratios, for instance for Vout/Vin<1/7. For example a typical conversion ratio may be Vout/Vin=1/12. The converter 1000 is similar to the converter 600, in which the switch S5 has been replaced by a pre-converter stage. The pre-converter stage, also referred to as first port stage or input stage, may be implemented as a serial-parallel topology, a Dickson topology or any other capacitive voltage divider topology.

The DC-DC converter 1000 includes an inductor L and three flying capacitors $C_{F1}$, $C_{F2}$ and $C_{F3}$ coupled between a first port (input node 1002) and a second port (output node 1004) by a network of switches formed of nine switches S1-S9. An input capacitor Cin is provided between the input node 1002 and ground and an output capacitor Cout is provided between the output node 1004 and ground.

An input stage is provided between the input node 1002 and an intermediate node 1014, and an output stage is provided between the intermediate node 1014 and the output node 1004. The input stage is formed of $C_{F3}$ and switches S1, S2, S3, S4. The third flying capacitor $C_{F3}$ has a first terminal at node 1010 coupled to the input node via the input switch S1 and a second terminal at node 1012 coupled to ground via the ground switch S4. The first terminal of $C_{F3}$ is coupled to the output stage via the capacitor switch S2 provided between the nodes 1010 and 1014. Similarly the second terminal of $C_{F3}$ is coupled to the output stage via the capacitor switch S3 provided between the nodes 1012 and 1014.

The output stage is formed of $C_{F1}$, $C_{F2}$ and switches S5, S6, S7, S8, and S9. The first flying capacitor $C_{F1}$ has a first terminal coupled to the second flying capacitor $C_{F2}$ via the switch S5 and a second terminal coupled to ground via the ground switch S7, and to the output node 1004 via switch S9. The second flying capacitor $C_{F2}$ has a first terminal at node 1006 coupled to S5 and a second terminal at node 1008 coupled to ground via S8. The inductor L has a first terminal coupled to the second flying capacitor $C_{F2}$ at node 1008 and a second terminal coupled to the output node 1004. The first terminal of $C_{F2}$ is coupled to the output node 1004 via switch S6. A driver (not shown) is provided to generate nine control signals Ct1-Ct9 to operate the switches S1-S9 respectively. The driver is adapted to operate the DC-DC converter 1000 with a sequence of states. The sequence of states may include a magnetization state and a de-magnetization state. The driver may be configured to maintain the magnetization state and the de-magnetization state for a predetermined duration during the drive period. For instance, a duty cycle of the magnetization state and a duty cycle of the de-magnetization state may be selected to achieve a target conversion ratio.

Figure 11A:
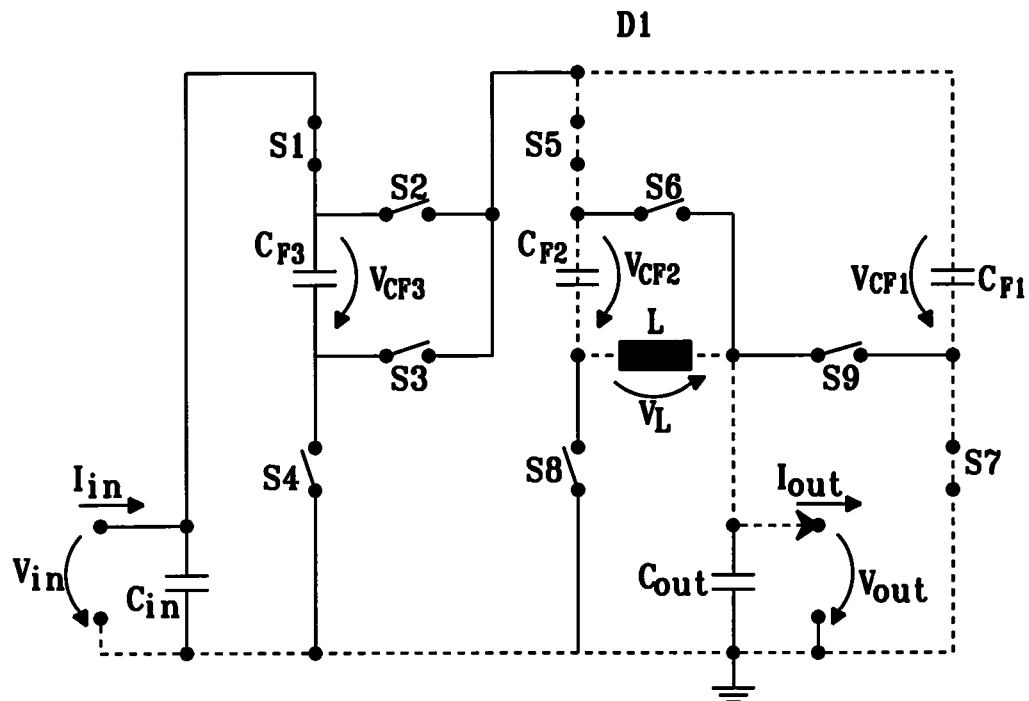
FIG. 11A is a diagram of a first magnetization state for operating the power converter of FIG. 10.

FIG. 11A illustrates the DC-DC converter of FIG. 10 operating in a magnetization state D1, in which the switches S5 and S7 are closed while the switches S2, S4, S6, S8 and S9 are open, and at least one of S1 and S3 are also open. The input node is decoupled or disconnected from the output node. The ground is coupled to the output node via a path that includes S7, CF1, S5, CF2 and the inductor L.

Figure 11B:
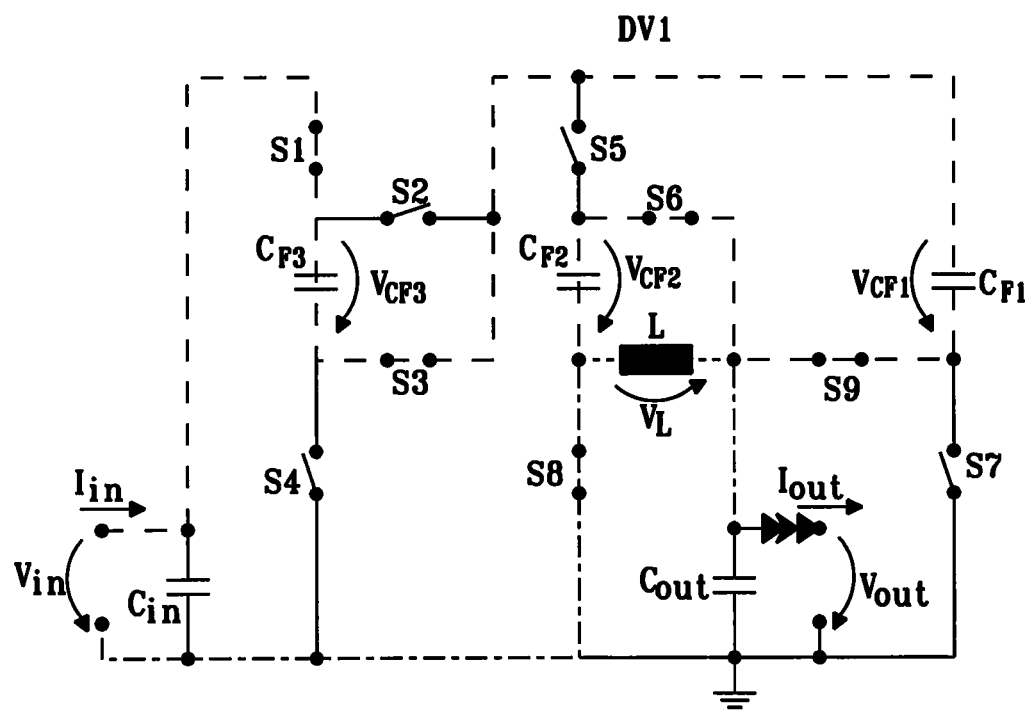
FIG. 11B is a diagram of a first de-magnetization state for operating the power converter of FIG. 10.

FIG. 11B illustrates the DC-DC converter of FIG. 10 operating in a de-magnetization state DV1, in which the switches S1, S3, S6, S8 and S9 are closed while the remaining switches S2, S4, S5 and S7 are open. The input node is coupled to the output node via an input path that includes S1, $C_{F3}$, S3, $C_{F1}$, S9 which bypasses the inductor L. The ground is coupled to the output node via two paths: a ground path and a de-magnetization path. The ground path includes S8, $C_{F2}$, S6 while bypassing L. The de-magnetization path includes S8 and the inductor L.

Figure 11C:
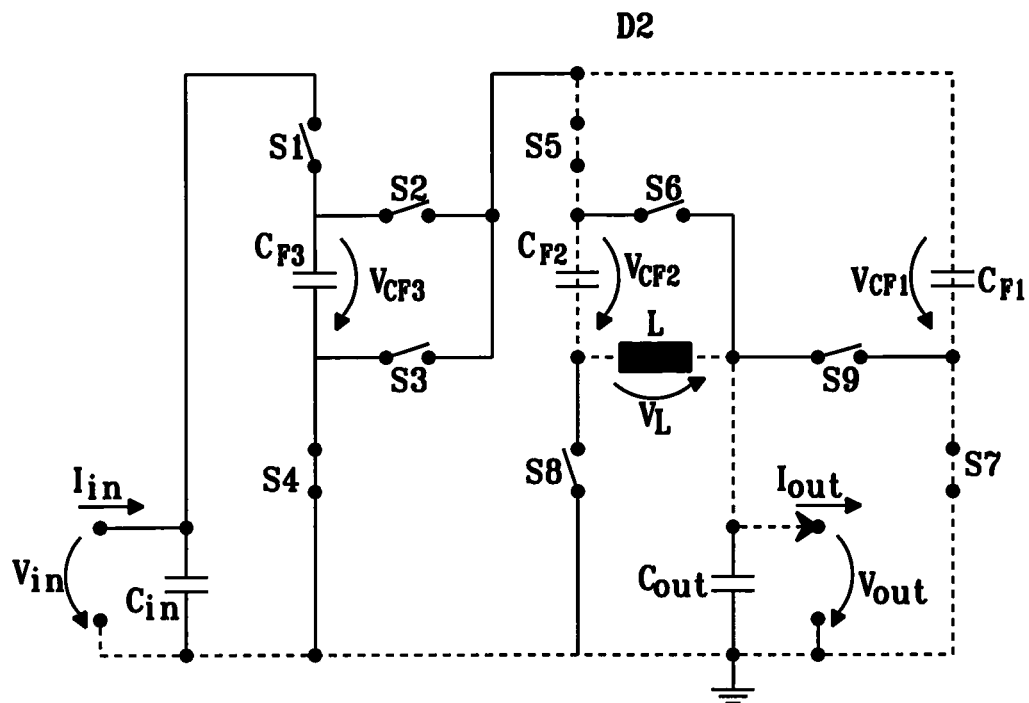
FIG. 11C is a diagram of a second magnetization state for operating the power converter of FIG. 10.

FIG. 11C illustrates the DC-DC converter of FIG. 10 operating in a second magnetization state D2, in which the switches S5 and S7 are closed while the switches S1, S3, S6, S8 and S9 are open, and at least one of S2 and S4 are also open. The input node is decoupled or disconnected from the output node. The ground is coupled to the output node via a path that includes S7, CF1, S5, CF2 and the inductor L.

Figure 11D:
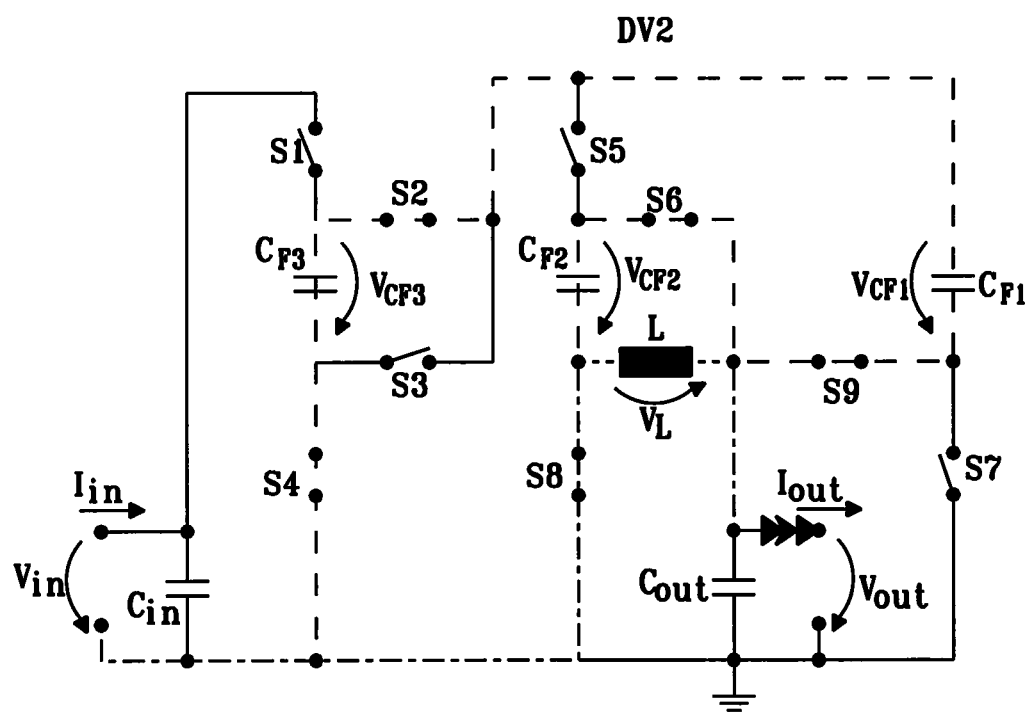
FIG. 11D is a diagram of a second de-magnetization state for operating the power converter of FIG. 10.

FIG. 11D illustrates the DC-DC converter of FIG. 10 operating in a de-magnetization state DV2, in which the switches S2, S4, S6, S8 and S9 are closed while the remaining switches S1, S3, S5 and S7 are open. The input node is de-coupled from the output node. The ground is coupled to the output node via three paths: a first ground path, a second ground path and a de-magnetization path. The first ground path includes S4, $C_{F3}$, S2, $C_{F1}$, S9 and bypasses the inductor L. The second ground path includes S8, $C_{F2}$, S6 while bypassing L. The de-magnetization path includes S8 and the inductor L.

Figure 12:
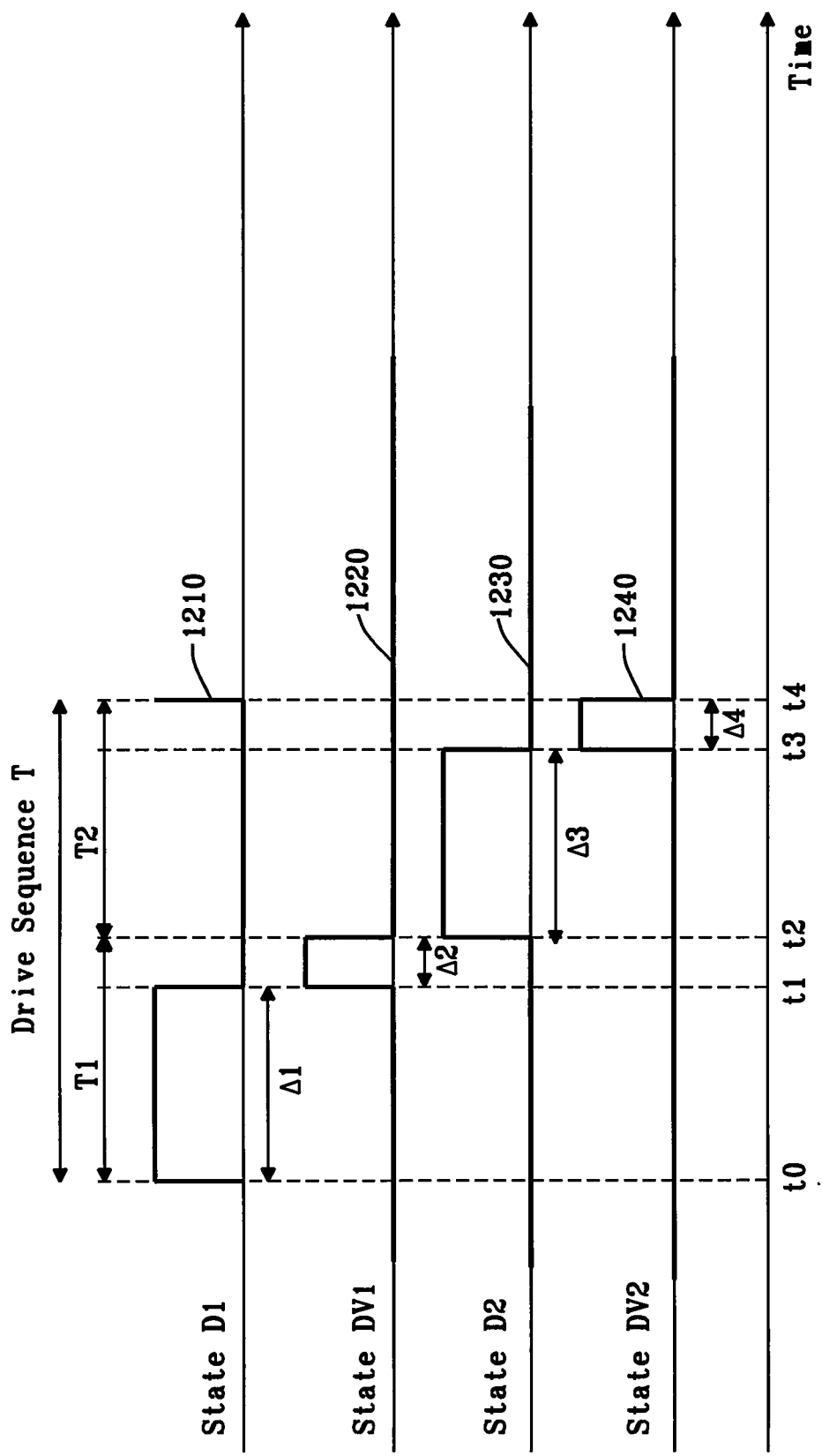
FIG. 12 is a plot of a drive sequence for operating the power converter of FIG. 10.

FIG. 12 illustrates a drive sequence for operating the DC-DC converter 1000. The drive sequence has a drive period T=T1+T2, in which T1 is the drive period of a cycle of the states D1 and DV1 and T2, in which T2 is the drive period of a cycle of the states D2 and DV2. In this example, the driver drives the DC-DC converter 1000 with the magnetization state D1 (waveform 1210) between the times t0 and t1 for a duration Δ1, then with the de-magnetization state DV1 (waveform 1220) between the time t1 and t2 for a duration Δ2, then with the magnetization state D2 (waveform 1230) between the times t2 and t3 for a duration Δ3, then with the de-magnetization state DV2 (waveform 1240) between the time t3 and t4 for a duration Δ4. This drive sequence D1/DV1/D2/DV2 is then repeated over time to deliver the required output power.

In operation the flying capacitors are automatically charged towards $V_{CF3}=V_{IN}/2$, $V_{CF2}=V_{OUT}$ and $V_{CF1}=V_{IN}/2-V_{OUT}$.

The ratio between input and load current level follows equation (10). The relation between input and output voltage may be expressed as:

$$\frac{V_{OUT}}{V_{IN}} = \frac{D}{2+4D} \quad (15)$$

$$Dx = D, DVx = 1 - D$$

$$D \in [0, 1]$$

in which $D_X$ is the duty cycle of the magnetization state D1 or D2 and $D_{VX}$ is the duty cycle of the de-magnetization state DV1 or DV2.

The theoretical maximum voltage conversion ratio derived from equation (15) is $V_{OUT}/V_{IN}=1/4$ for D=1. However, for D=1, $D_{VX}=0$ and there is no time during the drive period to re-distribute the charge from flying capacitors $C_{F1}$ and $C_{F2}$ into the output capacitor $C_{OUT}$ as this would require an infinite current causing a corresponding infinite $I^2R$ conduction loss. The charge of capacitor $C_{F3}$ is controlled by the ratio DV1/DV2. Current distribution may be achieved by restricting the duty cycle to a value less than 1, for instance D≤3/4. For D=3/4 a practical maximum voltage conversion ratio of $V_{OUT}/V_{IN}=3/20$ is achieved. The drive sequence of FIG. 12 is illustrated for a conversion ratio $$\frac{V_{out}}{V_{in}} = \frac{3}{20}$$

in which T1=T2=T/2, Δ1=Δ3=3/4 T1, and Δ2=Δ4=1/4 T1.

Higher output voltages may be achieved by using other states (in the case of a Buck converter, additional magnetizations states) in addition to the switching states D1 and D2.

Figure 13A:
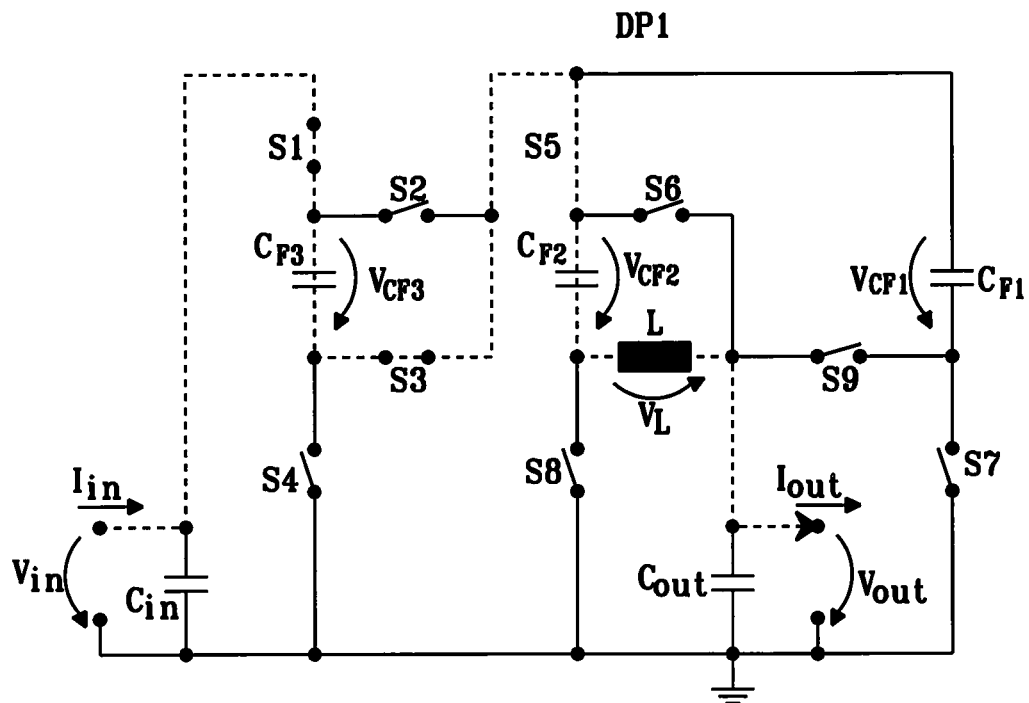
FIG. 13A is a diagram of another magnetization state for operating the power converter of FIG. 10.

FIG. 13A illustrates the DC-DC converter of FIG. 10 operating in a magnetization state DP1, in which the switches S1, S3, S5 are closed while the remaining switches S2, S4, S6, S7, S8 and S9 are open. The input node is coupled to the output node via a magnetization path that includes S1, $C_{F3}$, S3, S5, $C_{F2}$ and L. The ground is decoupled from the output node.

Figure 13B:
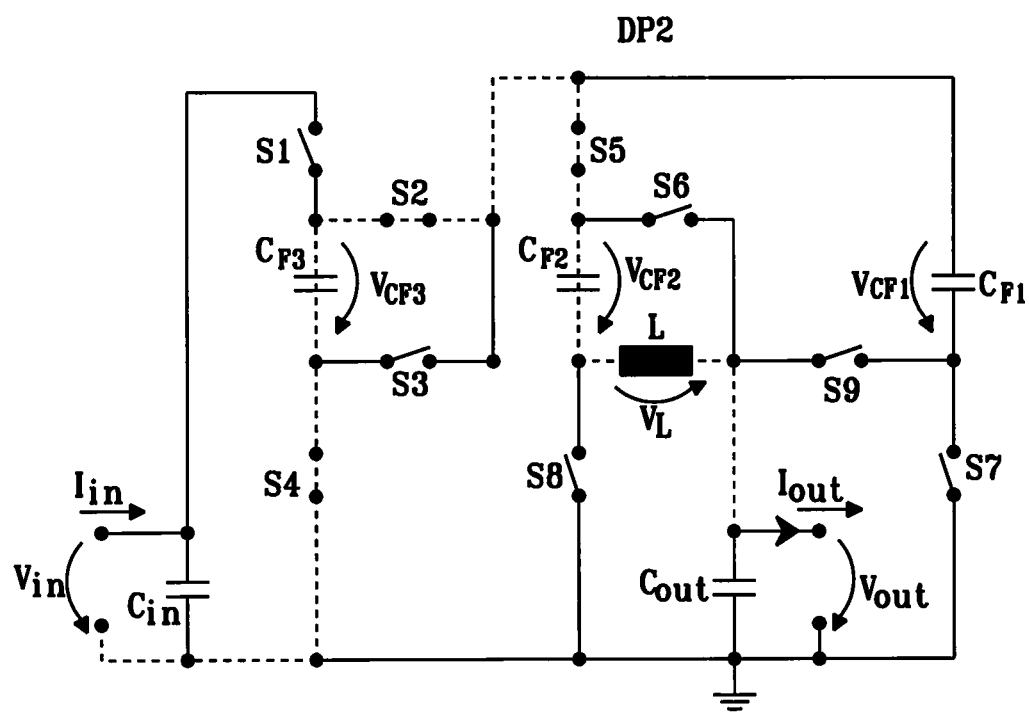
FIG. 13B is a diagram of yet another magnetization state for operating the power converter of FIG. 10.

FIG. 13B illustrates the DC-DC converter of FIG. 10 operating in a magnetization state DP2, in which the switches S2, S4 and S5 are closed while the remaining switches S1, S3, S6, S7, S8 and S9 are open. The input node is decoupled or disconnected from the output node. The ground is coupled to the output node via a path that includes S4, $C_{F3}$, S2, S5, $C_{F2}$ and the inductor L.

These states introduce inductor magnetization current from the input port (through flying capacitor $C_{F2}$). By restricting the duty cycle to D≤3/4, an increased practical maximum voltage conversion ratio can be achieved. For example, for D=3/4, the ratio $V_{OUT}/V_{IN}$=3/16.

$$\frac{V_{OUT}}{V_{IN}} = \frac{D}{4} \quad (16)$$

$$D_{P2} = 2D - 1, D_P = D_V = 1 - D$$

$$D \in [0.5, 0.75]$$

Figure 14:
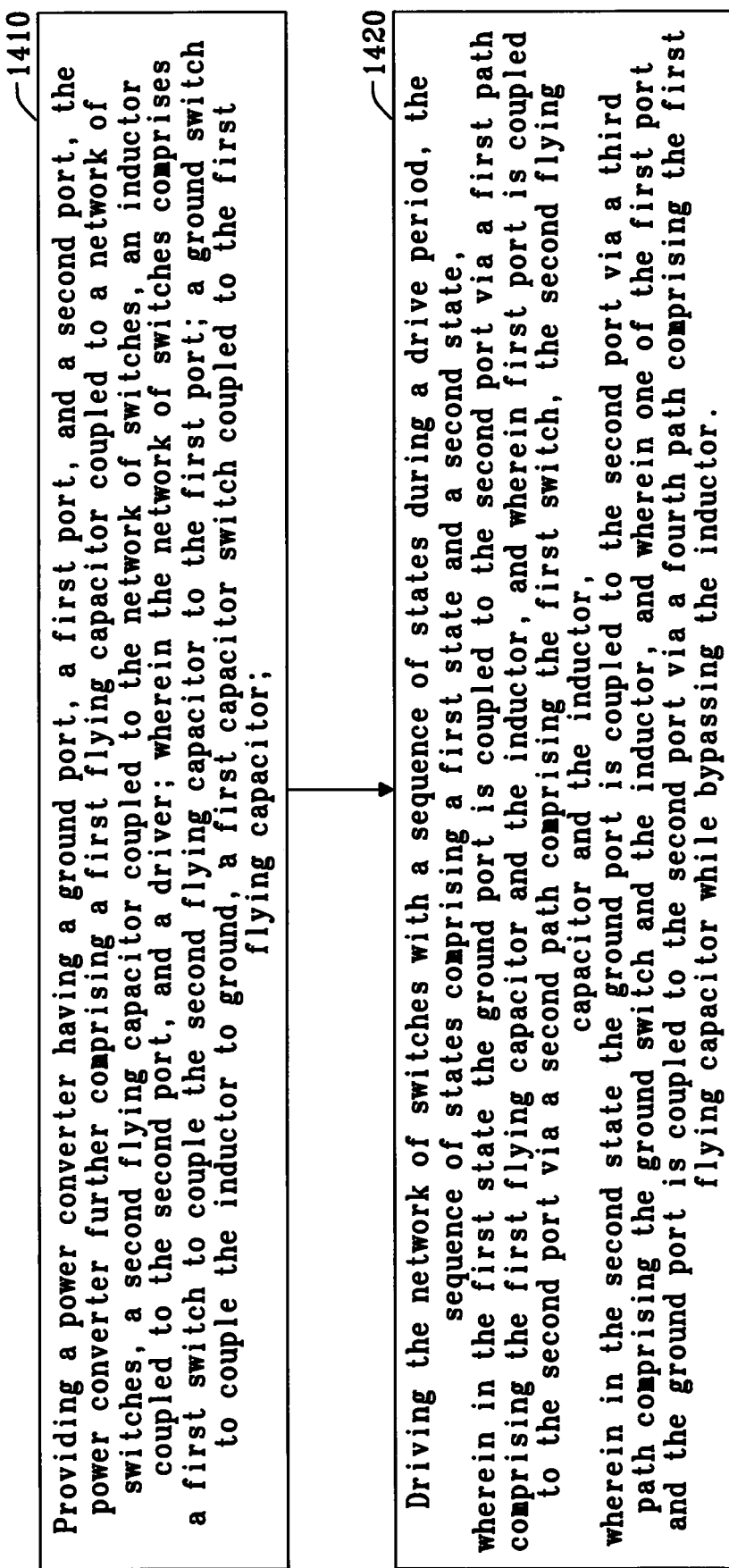
FIG. 14 is a flow chart of another method for providing a voltage with an input to output conversion ratio according to the disclosure.

FIG. 14 is a flow chart of another method for converting power with a target conversion ratio according to the disclosure.

At step 1410 a power converter having a ground port, a first port, and a second port is provided. The power converter can operate either as a step-down converter or as a step-up converter. When the power converter operates as a step-down converter the first port receives an input voltage and the second port provides the output voltage. When the power converter operates as a step-up converter the second port receives an input voltage and the first port provides the output voltage. The power converter includes a first flying capacitor coupled to a network of switches, a second flying capacitor coupled to the network of switches, an inductor coupled to the second port, and a driver. The network of switches comprises a first switch to couple the second flying capacitor to the first port; a ground switch to couple the inductor to ground, and a first capacitor switch coupled to the first flying capacitor.

At step 1420, the network of switches is driven with a sequence of states during a drive period. The sequence of states comprises a first state and a second state. In the first state the ground port is coupled to the second port via a first path comprising the first flying capacitor and the inductor, and wherein the first port is coupled to the second port via a second path comprising the first switch, the second flying capacitor and the inductor. In the second state the ground port is coupled to the second port via a third path comprising the ground switch and the inductor, and one of the first port and the ground port is coupled to the second port via a fourth path comprising the first flying capacitor while bypassing the inductor. As a result, in the first state a reduced current is flowing between the first port and the second port. For instance, when operating as a buck converter, a reduced current is pulled from the first port to the second port.

Similarly, when operating as a boost converter, a reduced current is pulled from the second port to the first port.

When the power converter operates as a step-down converter, the first state is a magnetization state and the second state is a de-magnetization state. Conversely, when the power converter operates as a step-up converter, the first state is a de-magnetization state and the second state is a magnetization state.

Figure 15:
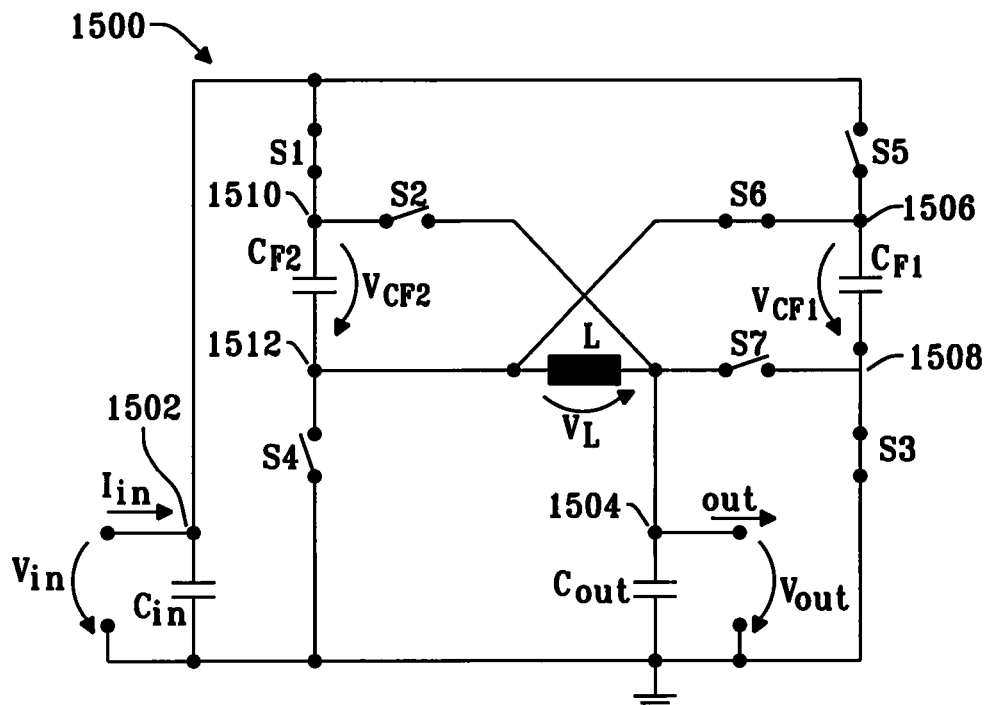
FIG. 15 is a diagram of a power converter for implementing the method of FIG. 14.

FIG. 15 is a diagram of a DC-DC converter 1500 for implementing the method of FIG. 14. The DC-DC converter 1500 includes an inductor L and two flying capacitors $C_{F1}$ and $C_{F2}$ coupled between a first port (input node 1502) and a second port (output node 1504) by a network of switches formed of seven switches S1-S7. An input capacitor Cin is provided between the input node 1502 and ground and an output capacitor Cout is provided between the output node 1504 and ground.

The first flying capacitor $C_{F1}$ has a first terminal at node 1506 coupled to the input node 1502 via the capacitor switch S5 and a second terminal at node 1508 coupled to ground via the ground switch S3. The second flying capacitor $C_{F2}$ has a first terminal at node 1510 coupled to the input node via the switch S1 (also referred to as input switch) and a second terminal at node 1512 coupled to ground via the ground switch S4. The inductor L has a first terminal at node 1512 and a second terminal coupled to the output node 1504. The first inductor terminal is coupled to $C_{F1}$ via the inductor switch S6 at node 1506, and to $C_{F2}$ at node 1512. The first inductor terminal is also coupled to ground via the switch S4. The second terminal of $C_{F1}$ is coupled to the output node 1504 via the switch S7. The first terminal of $C_{F2}$ is coupled to the output node 1504 via the switch S2. A driver (not shown) is provided to generate seven control signals Ct1-Ct7 to operate the switches S1-S7 respectively. The driver is adapted to operate the DC-DC converter 1500 with a sequence of states. The sequence of states may include a magnetization state and a de-magnetization state. The driver may be configured to maintain the magnetization state and the de-magnetization state for a predetermined duration during the drive period. For instance, a duty cycle of the magnetization state and a duty cycle of the de-magnetization state may be selected to achieve a target conversion ratio.

Figure 16A:
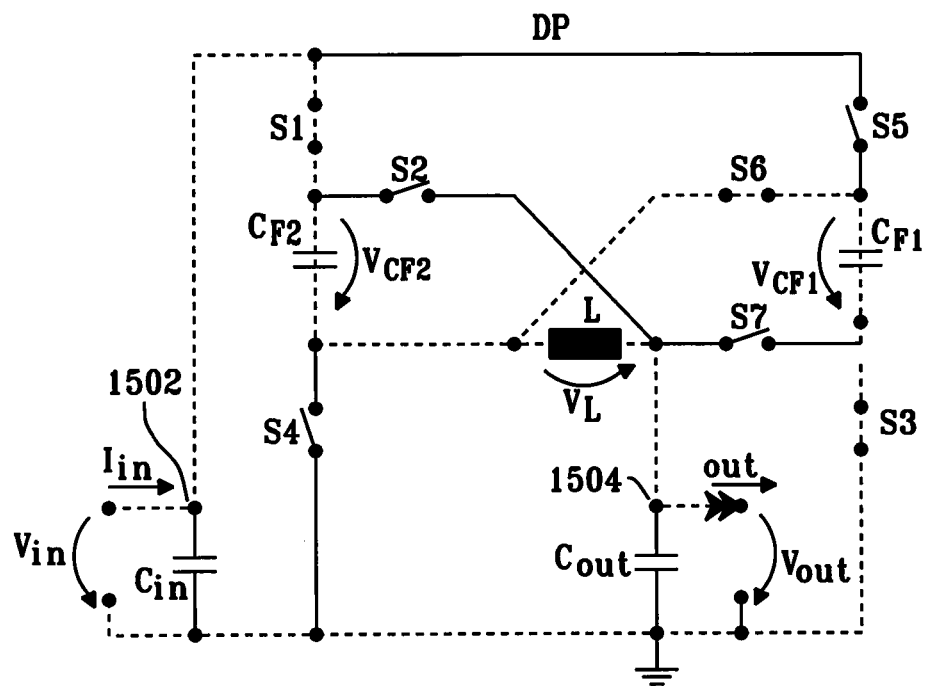
FIG. 16A is a diagram of a magnetization state for operating the power converter of FIG. 15.

FIG. 16A illustrates the DC-DC converter of FIG. 15 operating in a magnetization state DP, in which the switches S1, S3 and S6 are closed while the remaining switches S2, S4, S5 and S7 are open. The input node 1502 is coupled to the output node 1504 via a first path or magnetization path that includes S1, $C_{F2}$ and the inductor L. The ground port is coupled to the output node 1504 via a second path or second magnetization path that includes S3, $C_{F1}$, S6 and the inductor L.

Figure 16B:
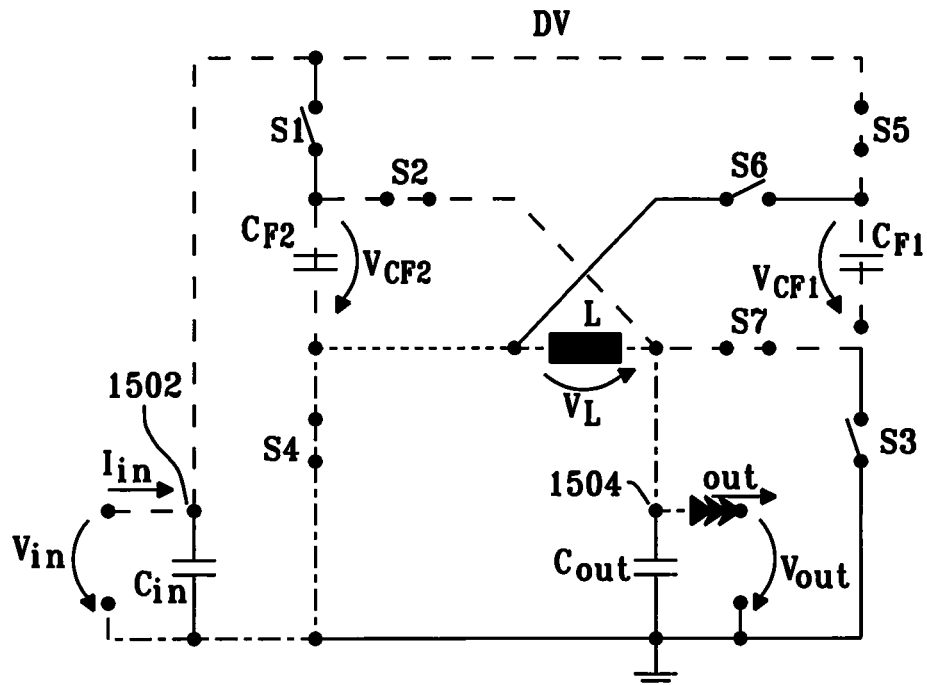
FIG. 16B is a diagram of a de-magnetization state for operating the power converter of FIG. 15.

FIG. 16B illustrates the DC-DC converter of FIG. 15 operating in a de-magnetization state DV, in which the switches S2, S4, S5 and S7 are closed while the remaining switches S1, S3 and S6 are open. The input node 1502 is coupled to the output node 1504 via a path that includes S5, $C_{F1}$, S7, which bypasses the inductor L. The ground is coupled to the output node 1504 via a path also referred to as de-magnetization path that includes S4 and the inductor L; and by another path also referred to as ground path that includes S4, CF2, and S2, which also bypasses the inductor L.

In operation the flying capacitors are automatically charged to $V_{CF2}=V_{OUT}$ and $V_{CF1}=V_{IN}-V_{OUT}$. The relationship between input and output voltage follows equation (8).

As illustrated in FIGS. 16A and 16B a current is provided from the input terminal during both the magnetization state DP and the de-magnetization state DV. As a result, the converter 1500 implements continuous input current over the driving period and the input current is reduced compared with the converter 600 of FIG. 6 especially for voltage conversion ratios close to the maximum ratio of $V_{OUT}/V_{IN}=1/2$. For this range of operation, the converter 1500 operates like a transformer for DC voltages with an input current level close to ½ of the load current.

Figure 17:
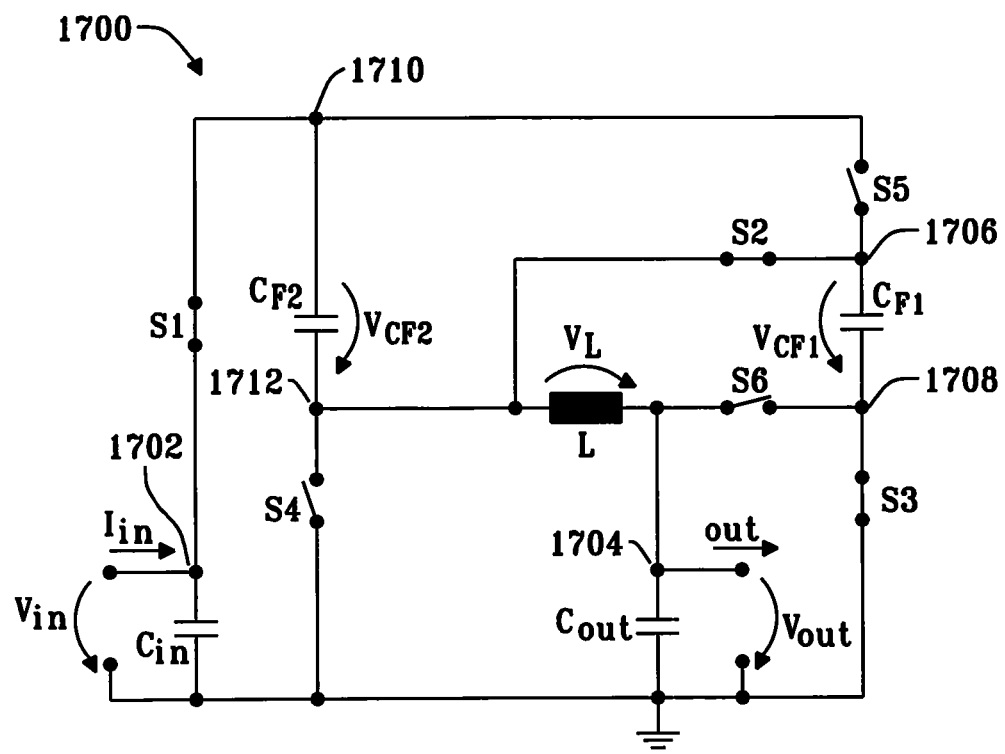
FIG. 17 is a diagram of another power converter for implementing the method of FIG. 14.

FIG. 17 is a diagram of another DC-DC converter 1700 for implementing the method of FIG. 14. The DC-DC converter 1700 includes an inductor L and two flying capacitors $C_{F1}$ and $C_{F2}$ coupled between a first port (input node 1702) and a second port (output node 1704) by a network of switches formed of six switches S1-S6. An input capacitor Cin is provided between the input node 1702 and ground and an output capacitor Cout is provided between the output node 1704 and ground.

The first flying capacitor $C_{F1}$ has a first terminal at node 1706 coupled to CF2 via the capacitor switch S5, and a second terminal at node 1708 coupled to ground via the ground switch S3, and to the output node 1704 via switch S6.

The second flying capacitor $C_{F2}$ has a first terminal at node 1710 coupled to the input node 1702 via the first switch or input switch S1, and a second terminal at node 1712 coupled to ground via the ground switch S4. The inductor L has a first inductor terminal coupled to ground via S4 and a second inductor terminal coupled to the output node 1704. The first inductor terminal is coupled to $C_{F2}$ at node 1712, and to $C_{F1}$ via the inductor switch S2 at node 1706. A driver (not shown) is provided to generate six control signals Ct1-Ct6 to operate the switches S1-S6 respectively. The driver is adapted to operate the DC-DC converter 1700 with a sequence of states. The sequence of states may include a magnetization state and a de-magnetization state. The driver may be configured to maintain the magnetization state and the de-magnetization state for a predetermined duration during the drive period. For instance, a duty cycle of the magnetization state and a duty cycle of the de-magnetization state may be selected to achieve a target conversion ratio.

Figure 18A:
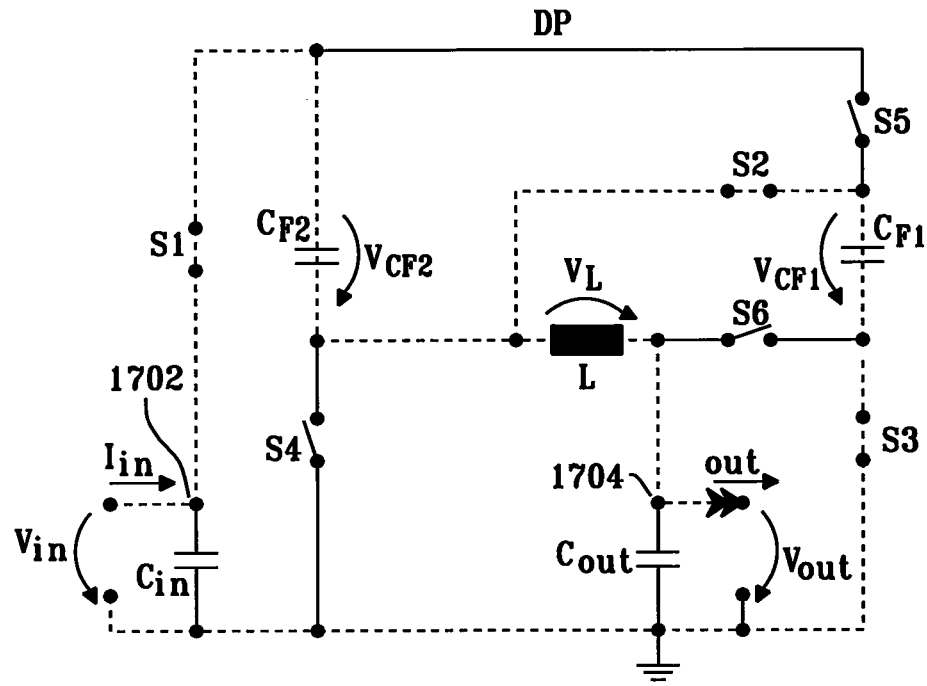
FIG. 18A is a diagram of a magnetization state for operating the power converter of FIG. 17.

FIG. 18A illustrates the DC-DC converter of FIG. 17 operating in a magnetization state DP, in which the switches S1, S2, and S3 are closed while the remaining switches S4, S5 and S6 are open. The input node 1702 is coupled to the output node 1704 via a magnetization path that includes S1, $C_{F2}$ and the inductor L. The ground is coupled to the output node 1704 via a path that includes the S3, $C_{F1}$, S2 and the inductor L.

Figure 18B:
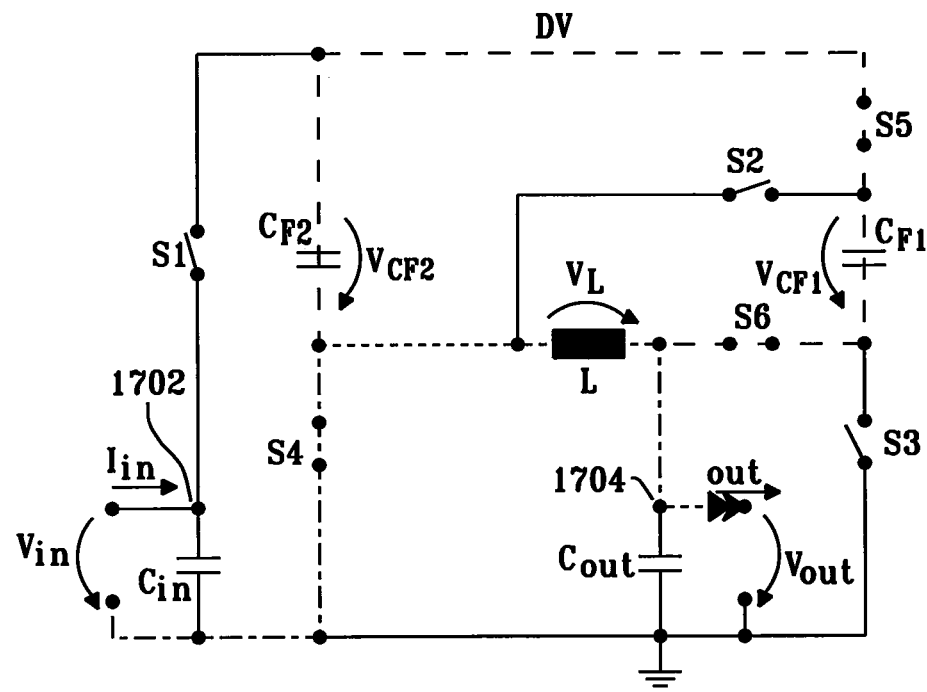
FIG. 18B is a diagram of a de-magnetization state for operating the power converter of FIG. 17

FIG. 18B illustrates the DC-DC converter of FIG. 17 operating in a de-magnetization state DV, in which the switches S4, S5, and S6 are closed while the remaining switches S1, S2, and S3 are open. The input node 1702 is de-coupled from the output node 1704. The ground is coupled to the output node 1704 via a de-magnetization path including S4 and the inductor L, and via another path including S4, $C_{F2}$, S5, $C_{F1}$ and S6, which bypasses the inductor L.

During the magnetization state DP, the converter 1700 typically provides half of the inductor magnetization current from the input terminal (via flying capacitor $C_{F2}$) and the other half from the ground terminal (via flying capacitor $C_{F1}$). During the de-magnetization state, the flying capacitors are connected in series to provide a supplement output current from the ground terminal. This operation prevents the occurrence of current spikes from the input node, typically generated when connecting the input and output capacitors directly through a flying capacitor.

The flying capacitors are automatically charged to $V_{CF2}=(V_{IN}+V_{OUT})/2$ and $V_{CF1}=(V_{IN}-V_{OUT})/2$.

A ratio of average input to output currents during the duty cycle $D_P$ of the magnetization state DP can be expressed as:

$$\frac{I_{IN}}{I_{OUT}} = \frac{1}{2+D} \text{ during } D_P = D \qquad (17)$$

$$D \in [0, 1]$$

The relationship between input and output voltage is:

$$\frac{V_{OUT}}{V_{IN}} = \frac{D}{2+D} \qquad (18)$$

$$D_P = D, D_V = 1 - D$$

$$D \in [0, 1]$$

For a voltage conversion ratio $V_{OUT}/V_{IN}=1/4$ the duty cycle is D=2/3. The amplitude of input current pulses $I_{IN}$ derived from equation (17) is just ⅜ of the load current $I_{OUT}$.

The theoretical maximum voltage conversion ratio derived from equation (18) is $V_{OUT}/V_{IN}=1/3$ for D=1. However, for D=1, $D_V=0$ and there is no time available during the drive period to re-distribute the charge from flying capacitors $C_{F1}$ and $C_{F2}$ into the output capacitor $C_{OUT}$ as this would require an infinite current causing a corresponding infinite $I^2R$ conduction loss. Current distribution may be achieved by restricting the duty cycle to a value less than 1, for instance D≤3/4. For D=3/4 a practical maximum voltage conversion ratio of $V_{OUT}/V_{IN}=3/11$ is achieved.

Therefore for output-to-input voltage conversion ratios larger than $V_{OUT}/V_{IN}=1/4$, the converter 1700 reduces the amplitude of input current pulses and reduces also the voltage rating of the demagnetization switch to approximately half the maximum input voltage.

The converter 1700 may be modified by replacing the switch S6 by a fixed connection between the second terminal of $C_{F1}$ and the output node and by removing the ground connection of $C_{F1}$ via S3. In this case the voltages across the flying capacitors would be expressed as $V_{CF2}=V_{IN}/2$ and $V_{CF1}=V_{IN}/2-V_{OUT}$. However in this scenario the output current during inductor magnetization is reduced to ~50% of the inductor current, resulting in a slower transient load response and an increase in output current/voltage ripple especially at high duty cycle. The converter 800 may also be modified in a similar fashion.

The DC-DC converters described in relation to FIGS. 3 to 18 are configured to reduce the amplitude of input current pulses compared with conventional converters. This reduces both the power losses and the noise level on the power supply and corresponding EMI issues. By implementing a capacitive path bypassing the inductor, the losses due to the inductor DCR can also be reduced hence improving converter efficiency, voltage regulation and improving response to transient load current. Furthermore, when ramping-up the inductor current via an extended magnetization state, an additional charge is stored into the flying capacitors. This charge is consequently provided to the converter output port during the consecutive demagnetization state. This further reduces the output voltage drop during a sudden rise in load current. In addition, the voltage across the flying capacitor(s) does not require any regulation, hence reducing complexity in the control circuitry and the risk of interference with the regulation loops of converter output voltage and current.

The DC-DC converters described in relation to FIGS. 3 to 18 have been described as step-down converters also referred to as Buck converters. It will be appreciated that these converters may be operated in reverse (that is using the input as the output and the output as the input) as Boost converters to achieve step-up conversion. In this case, the magnetization (de-magnetization) phase in the buck operation becomes a de-magnetization (magnetization) phase in the boost operation.

The transfer function of a traditional boost converter contains a so-called right-half-plane zero, as described in publication titled "Right-Half-Plane Zero Elimination for Boost Converter Using Magnetic Coupling With Forward Energy Transfer", IEEE, 2019 by Poorali. The zero results from the fact that a converter provides the output current during inductor demagnetization. This limits the bandwidth of a closed-loop control system in continuous conduction mode (CCM). As a result traditional boost converters are implementing increased output voltage ripple for applications having fast dynamics.

Figure 19:
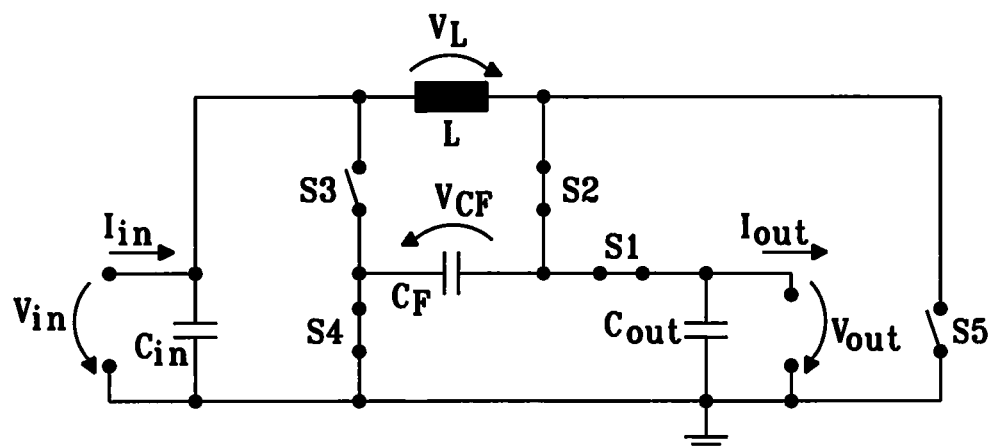
FIG. 19 is a diagram of FIG. 3 represented with inverted input and output ports.

FIG. 19 shows the diagram of FIG. 3 represented with inverted input and output ports.

Figure 20A:
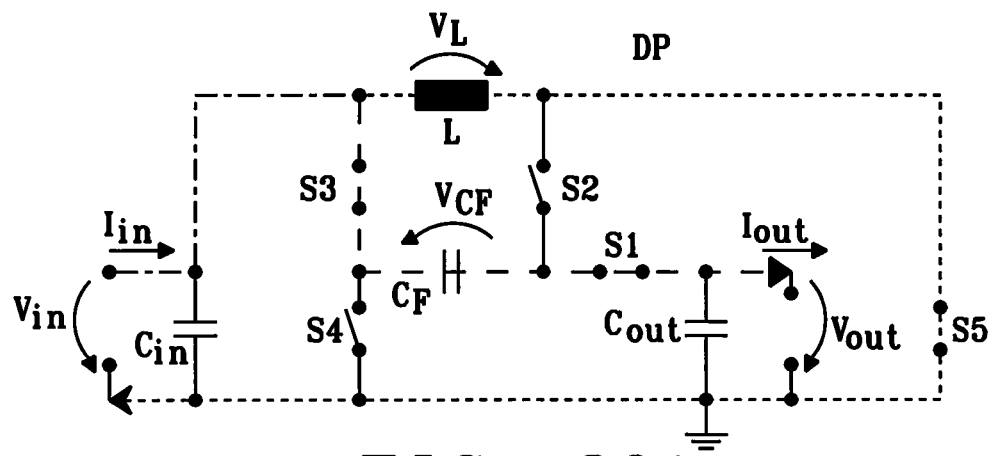
FIG. 20A is a diagram of a magnetization state for operating the power converter of FIG. 19.
Figure 20B:
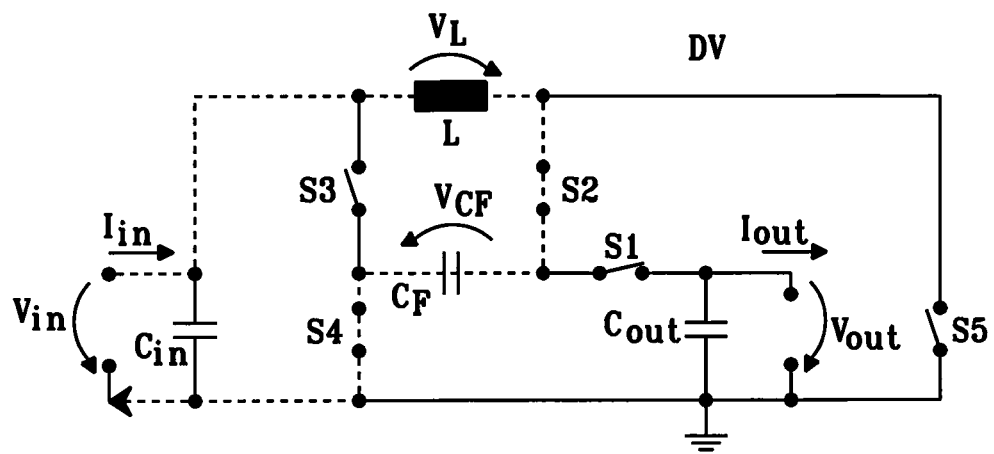
FIG. 20B is a diagram of a de-magnetization state for operating the power converter of FIG. 19.

FIGS. 20A and 20B illustrate the magnetization state DP and the demagnetization state DV, respectively.

FIG. 20A shows the DC-DC converter of FIG. 19 operating in a magnetization state DP, in which the switches S1, S3, and S5 are closed while the remaining switches S2, and S4 are open. The input node is coupled to the output node via an input path that includes $C_F$ and S3 and bypasses the inductor L. The input node is coupled to ground via a magnetization path including S5 and the inductor L.

FIG. 20B illustrates the DC-DC converter of FIG. 19 operating in a de-magnetization state DV, in which the switches S2, and S4 are closed while the remaining switches S1, S3 and S5 are open. The input node is decoupled or disconnected from the output node. The input node is coupled to the ground via a de-magnetization path that includes the S4, $C_F$, S2, and the inductor L.

In operation the DC-DC power converter of FIG. 19 pulls no current from the input terminal during inductor de-magnetization (see FIG. 20B). A current is pulled from the input terminal during the inductor magnetization switching state (see FIG. 20A). As illustrated above with respect to FIGS. 20A and 20B, the proposed topologies of the disclosure transfer the provision of converter output current into the switching state that magnetizes the inductor, effectively shifting the right-half-plane zero from the transfer function of the boost control loop to higher frequency.

Compared with transformer-less converters of the prior art, the converter topologies of the disclosure enable large voltage ratio boost conversion with improved power supply rejection and fast dynamic response.

The relationship between input and output voltage is obtained by applying the volt-sec balance principle to the voltage of the inductor:

$$\frac{V_{OUT}}{V_{IN}} = \frac{2-D}{1-D} \qquad (19)$$

$$D_P = D, D_V = 1 - D$$

$$D \in [0, 1]$$

According to equation (19), the theoretical minimum converter voltage conversion ratio is $V_{OUT}/V_{IN}=2$ for D=0. However, for D=0 there is no time available to re-distribute the charge from flying capacitor $C_F$ into the output capacitor $C_{OUT}$ (this would require an infinite current causing a corresponding infinite $I^2R$ conduction loss). A more balanced current distribution may be achieved by restricting the duty cycle to e.g. D≥1/4, resulting in a more realistic minimum voltage conversion ratio of $V_{OUT}/V_{IN}=7/3$ for D=1/4. For lower voltage conversion ratios, the switching state DV may be replaced partially or entirely with a modified demagnetization state DV2.

Figure 21:
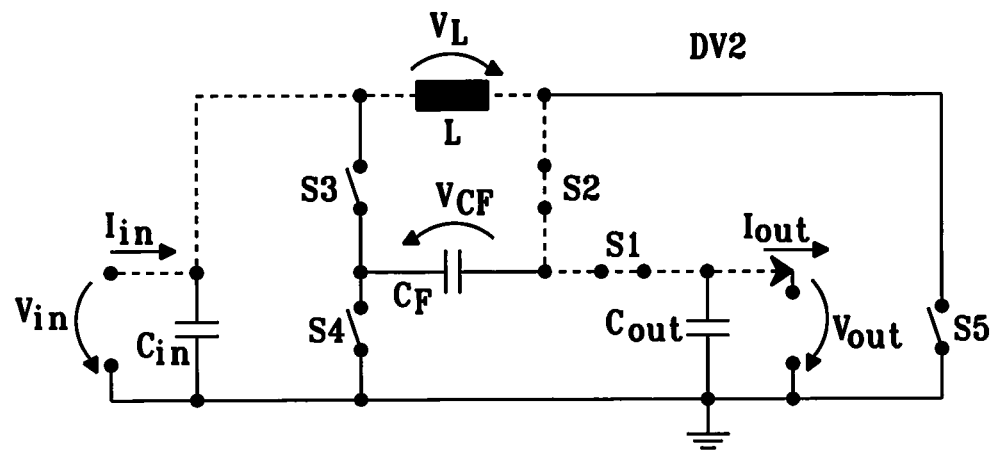
FIG. 21 is a diagram of another de-magnetization state for operating the power converter of FIG. 19.

FIG. 21 illustrates the DC-DC converter of FIG. 19 operating in a second de-magnetization state DV2, in which the switches S1 and S2 are closed while the remaining switches S3, S4 and S5 are open. The input node is coupled to the output node via a de-magnetization path that includes S1, S2 and the inductor L. The ground is not coupled to the output node.

By introducing an increasing share of DV2 for duty cycles below D<0.5 the relationship between input and output voltages becomes:

$$\frac{V_{OUT}}{V_{IN}} = \frac{1+D}{1-D} \qquad (20)$$

$$D_P = D_V = D, DV2 = 1 - 2D$$

$$D \in [0, 0.5]$$

An increasing share of switching state DV2 during inductor demagnetization makes the converter operation similar to that of a traditional boost converter with a minimum duty cycle of D=0 and a minimum voltage conversion ratio of $V_{OUT}/V_{IN}>1$. This has also the drawback of re-introducing larger impact from the right-half-plane zero.

Disabling negative inductor current at low output current to increase converter efficiency may be applied to step-up derivatives of the proposed converter topologies by opening the demagnetizing current path within the demagnetizing state $D_{VX}$ as soon as the inductor current is reaching zero.

Reducing the voltage rating of boost converter power switches to $V_{OUT}/2$ may be achieved for the topologies of FIGS. 8, 10 and 17 with inverted roles of input and output ports.

A skilled person will appreciate that variations of the disclosed arrangements are possible without departing from the disclosure. Accordingly, the above description of the specific embodiment is made by way of example only and not for the purposes of limitation. It will be clear to the skilled person that minor modifications may be made without significant changes to the operation described.

What is claimed is:

1. A power converter for providing an output voltage with a target conversion ratio, the power converter having a ground port, a first port, and a second port, wherein when the power converter operates as a step-down converter the first port receives an input voltage and the second port provides the output voltage and when the power converter operates as a step-up converter the second port receives an input voltage and the first port provides the output voltage; the power converter comprising
- a first flying capacitor coupled to a network of switches,
- an inductor coupled to the second port, and
- a driver;

the network of switches comprising
- a first switch to couple the first flying capacitor to the first port;
- a second switch to couple the inductor to ground;
- the driver being adapted to drive the network of switches with a sequence of states during a drive period, the sequence of states comprising a first state and a second state,
- wherein in the first state the ground port is coupled to the second port via a first path comprising the first flying capacitor and the inductor, and the first port is decoupled from the second port,
- wherein in the second state the ground port is coupled to the second port via a second path comprising the second switch and the inductor, and wherein the first port is coupled to the second port via a third path comprising the first flying capacitor while bypassing the inductor.

2. The power converter as claimed in claim 1, further comprising a second flying capacitor coupled to the second port via a first inductor switch, wherein the network of switches comprises a capacitor switch between the first flying capacitor and the second flying capacitor.

3. The power converter as claimed in claim 2, wherein in the first state the first path comprises the first flying capacitor, the capacitor switch, the second flying capacitor and the inductor, and wherein in the second state the ground port is coupled to the second port via a ground path comprising the second switch, the second flying capacitor and the first inductor switch, while bypassing the inductor.

4. The power converter as claimed in claim 2, wherein the network of switches comprises a second capacitor switch between the first flying capacitor and the second flying capacitor, and a ground switch to couple the second flying capacitor to the ground.

5. The power converter as claimed in claim 4, wherein the inductor is coupled to the first flying capacitor via a second inductor switch, and wherein the first flying capacitor is coupled to the second port via a third capacitor switch.

6. The power converter as claimed in claim 5, wherein in the first state the ground port is coupled to the second port via another path comprising the ground switch, the second flying capacitor, the first inductor switch and the inductor; and wherein in the second state the first port is coupled to the second port via a path comprising the capacitor switch, the second flying capacitor, the second capacitor switch, the first flying capacitor and the third capacitor switch, while bypassing the inductor.

7. The power converter as claimed in claim 2, further comprising a third flying capacitor, the third flying capacitor having a first terminal coupled to the first flying capacitor via a first coupling switch, and a second terminal coupled to the first flying capacitor via a second coupling switch.

8. The power converter as claimed in claim 7, wherein the driving sequence comprises a primary first-state, a secondary first-state, a primary second-state and a secondary second-state.

9. The power converter as claimed in claim 8, wherein in the primary second-state the ground port is coupled to the second port via a first ground path comprising the second flying capacitor while bypassing the inductor, and wherein the first port is coupled to the second port via a path comprising the first and third flying capacitors while bypassing the inductor.

10. The power converter as claimed in claim 9, wherein in the secondary second state the ground port is coupled to the second port via the first ground path, and a second ground path comprising the first and third flying capacitors while bypassing the inductor.

11. The power converter as claimed in claim 8, wherein in the primary and secondary first states the ground port is coupled to the second port via a path comprising the first flying capacitor, the second flying capacitor and the inductor.

12. The power converter as claimed in claim 11, wherein the driving sequence comprises a first additional state, and a second additional state, wherein in the first additional state the first port is coupled to the second port via a path comprising the second and third flying capacitors and the inductor, and wherein in the second additional state the ground port is coupled to the second port via a path comprising the second and third flying capacitors and the inductor.

13. The power converter as claimed in claim 1, wherein the driving sequence comprises another first state in which the ground port is de-coupled from the second port and wherein the first port is coupled to the second port via a path comprising the inductor.

14. The power converter as claimed in claim 1, further comprising a current sensor for sensing an inductor current through the inductor, wherein the driver is adapted to open the second switch during the second state upon sensing that the inductor current has reached a threshold value.

15. The power converter as claimed in claim 1, wherein the power converter is a step-down converter, the first state being a magnetization state and the second state being a de-magnetization state.

16. The power converter as claimed in claim 1, wherein the power converter is a step-up converter, the first state being a de-magnetization state and the second state being a magnetization state.

17. A method of converting power by providing an output voltage with a target conversion ratio, the method comprising
- providing a power converter having a ground port, a first port, and a second port, wherein when the power converter operates as a step-down converter the first port receives an input voltage and the second port provides the output voltage and when the power converter operates as a step-up converter the second port receives an input voltage and the first port provides the output voltage; the power converter comprising a first flying capacitor coupled to a network of switches, an inductor coupled to the second port, and a driver; the network of switches comprising a first switch to couple the first flying capacitor to the first port; a second switch to couple the inductor to ground;
- driving the network of switches with a sequence of states during a drive period, the sequence of states comprising a first state and a second state,
- wherein in the first state the ground port is coupled to the second port via a first path comprising the first flying capacitor and the inductor, and the first port is decoupled from the second port,
- wherein in the second state the ground port is coupled to the second port via a second path comprising the second switch and the inductor, and wherein the first port is coupled to the second port via a third path comprising the first flying capacitor while bypassing the inductor.

\* \* \* \* \*